April 14, 1959  R. H. CARTER ET AL  2,881,584
METHOD APPARATUS FOR PLYING AND CABLING YARN
Filed April 13, 1956  25 Sheets-Sheet 1

INVENTORS
Ralph H. Carter
and Chadwick B. Kingsbury
BY Rudolph S. Bley
their ATTORNEY INVENTORS
Ralph H. Carter
and Chadwick B. Kingsbury
BY
ATTORNEY April 14, 1959   R. H. CARTER ET AL   2,881,584
METHOD APPARATUS FOR PLYING AND CABLING YARN
Filed April 13, 1956   25 Sheets-Sheet 4
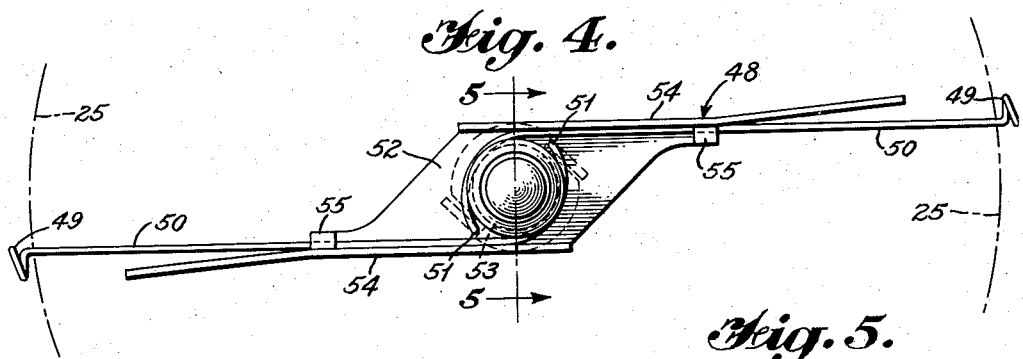
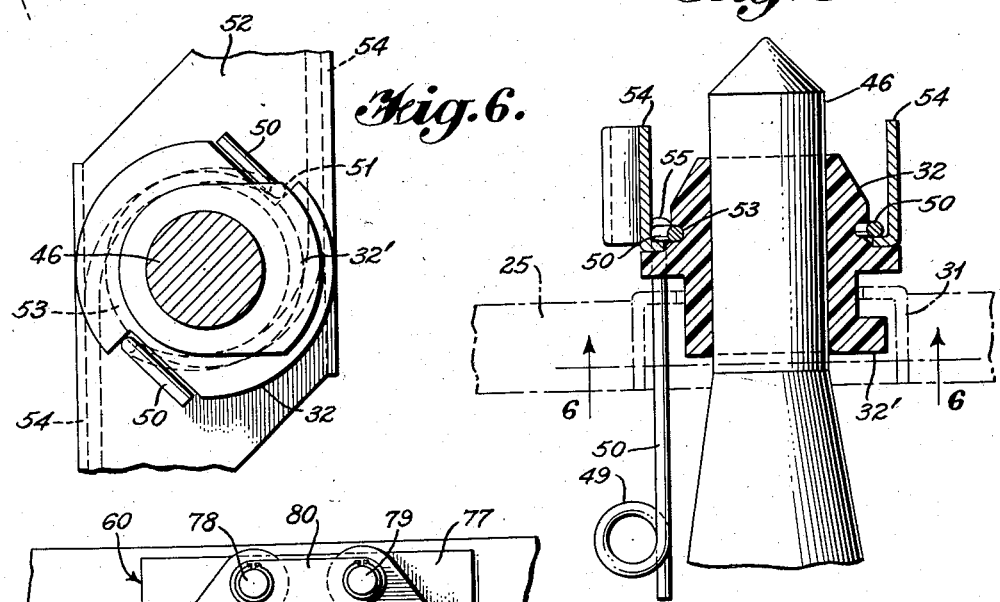
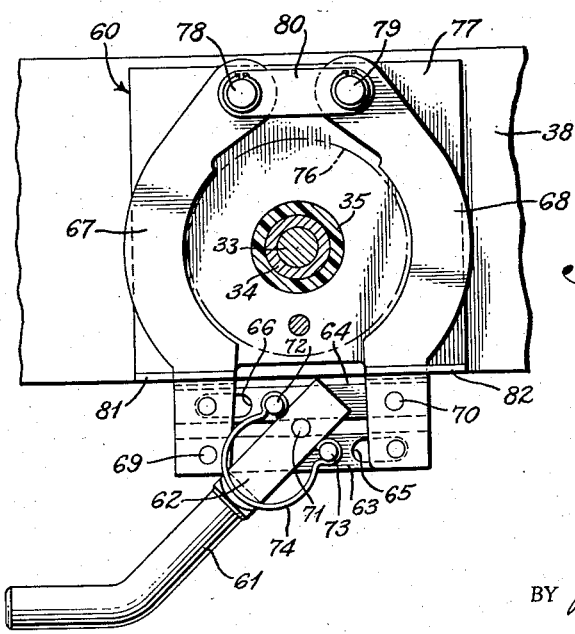
INVENTORS
Ralph H. Carter
and Chadwick B. Kingsbury
BY
ATTORNEY

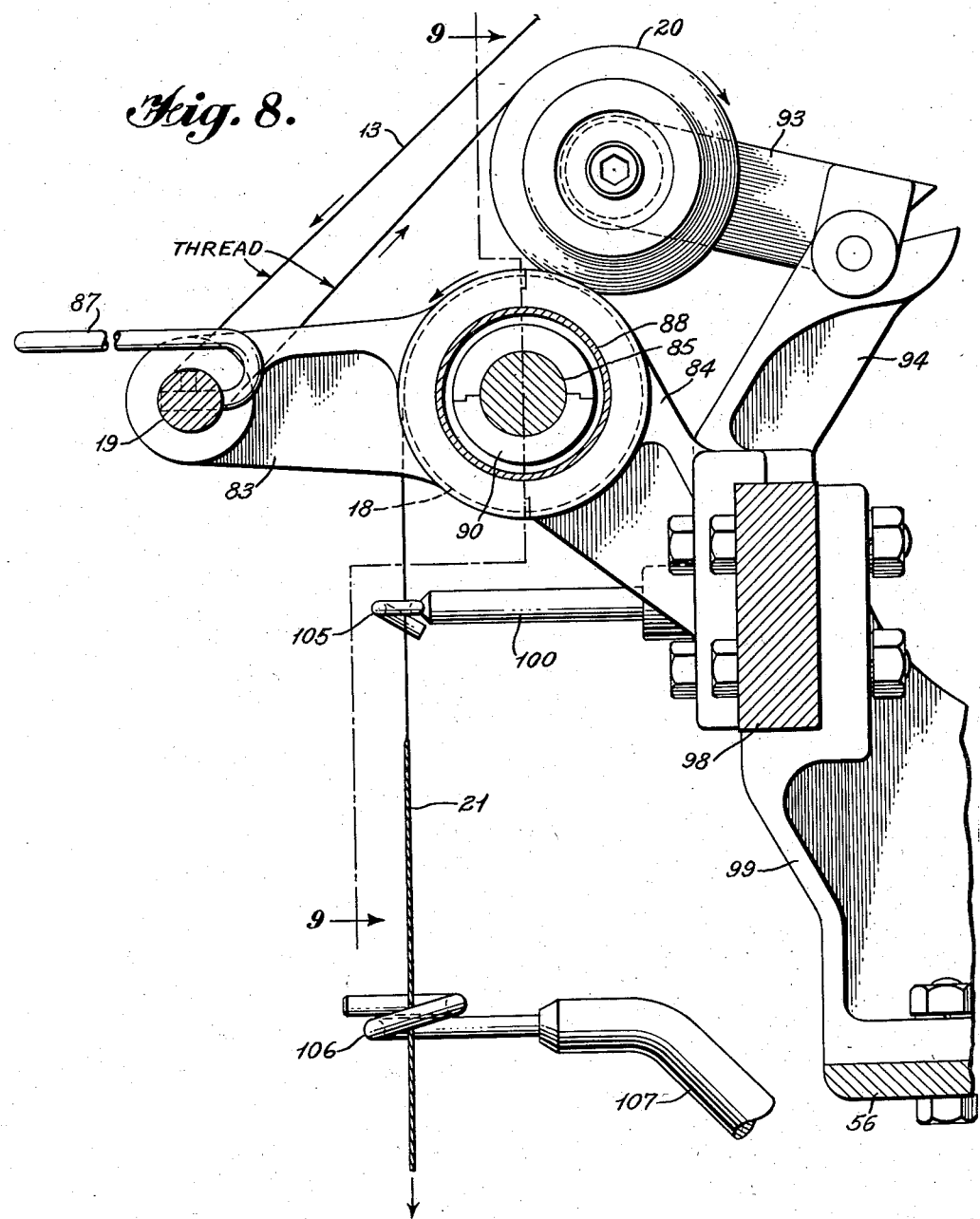

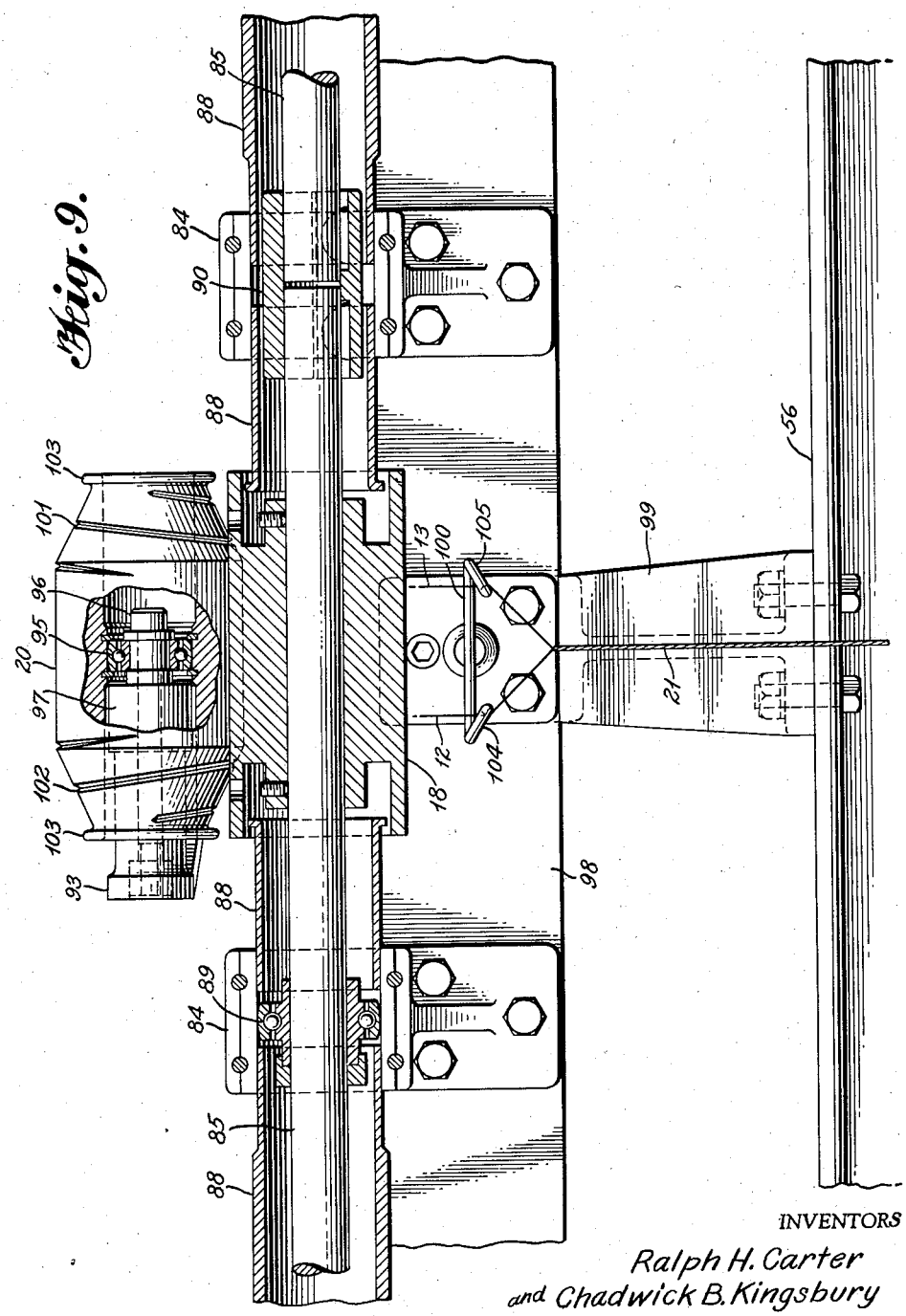

April 14, 1959  R. H. CARTER ET AL  2,881,584
METHOD APPARATUS FOR PLYING AND CABLING YARN
Filed April 13, 1956  25 Sheets-Sheet 7

INVENTORS
Ralph H. Carter
and Chadwick B. Kingsbury
BY
ATTORNEY

April 14, 1959  R. H. CARTER ET AL  2,881,584
METHOD APPARATUS FOR PLYING AND CABLING YARN
Filed April 13, 1956  25 Sheets-Sheet 8

INVENTORS
Ralph H. Carter
and Chadwick B. Kingsbury
BY
ATTORNEY

April 14, 1959 R. H. CARTER ET AL 2,881,584
METHOD APPARATUS FOR PLYING AND CABLING YARN
Filed April 13, 1956 25 Sheets-Sheet 9

INVENTORS
Ralph H. Carter
and Chadwick B. Kingsbury

BY *Rudolph S. Bley*
ATTORNEY

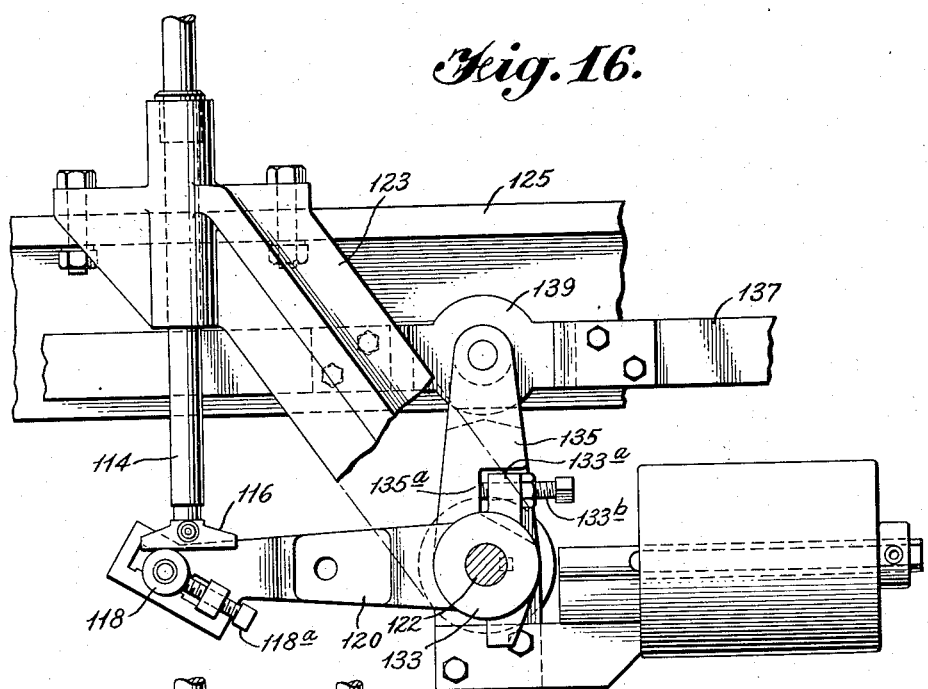
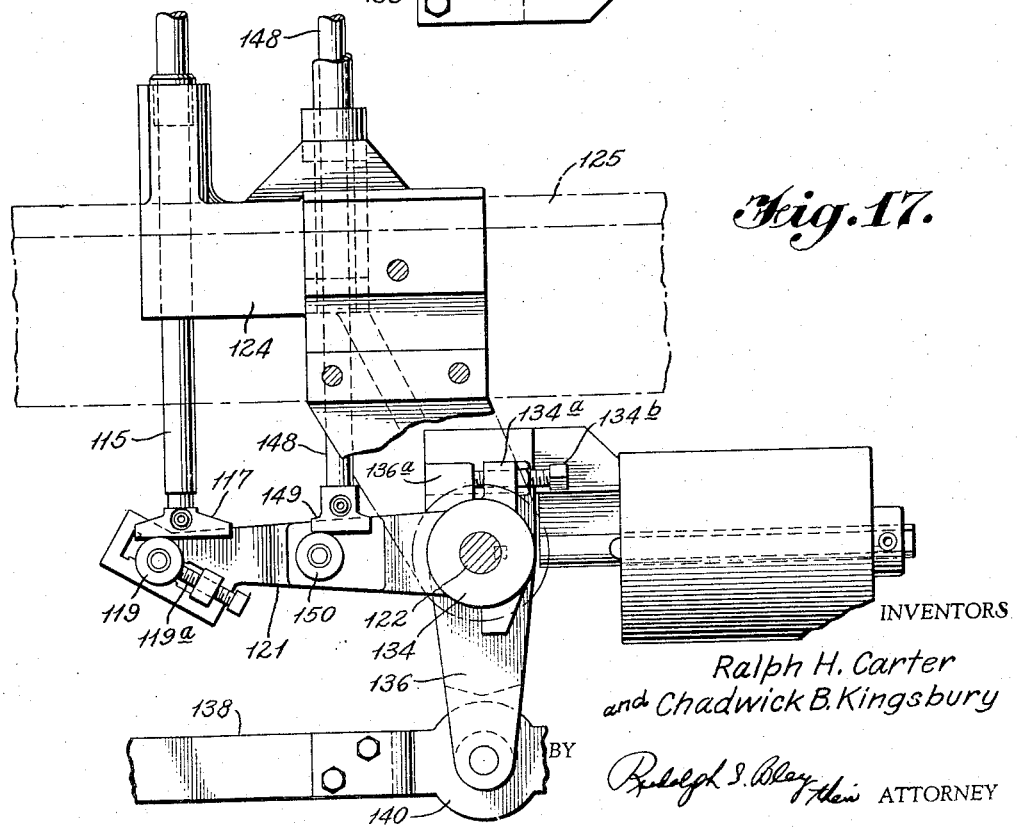

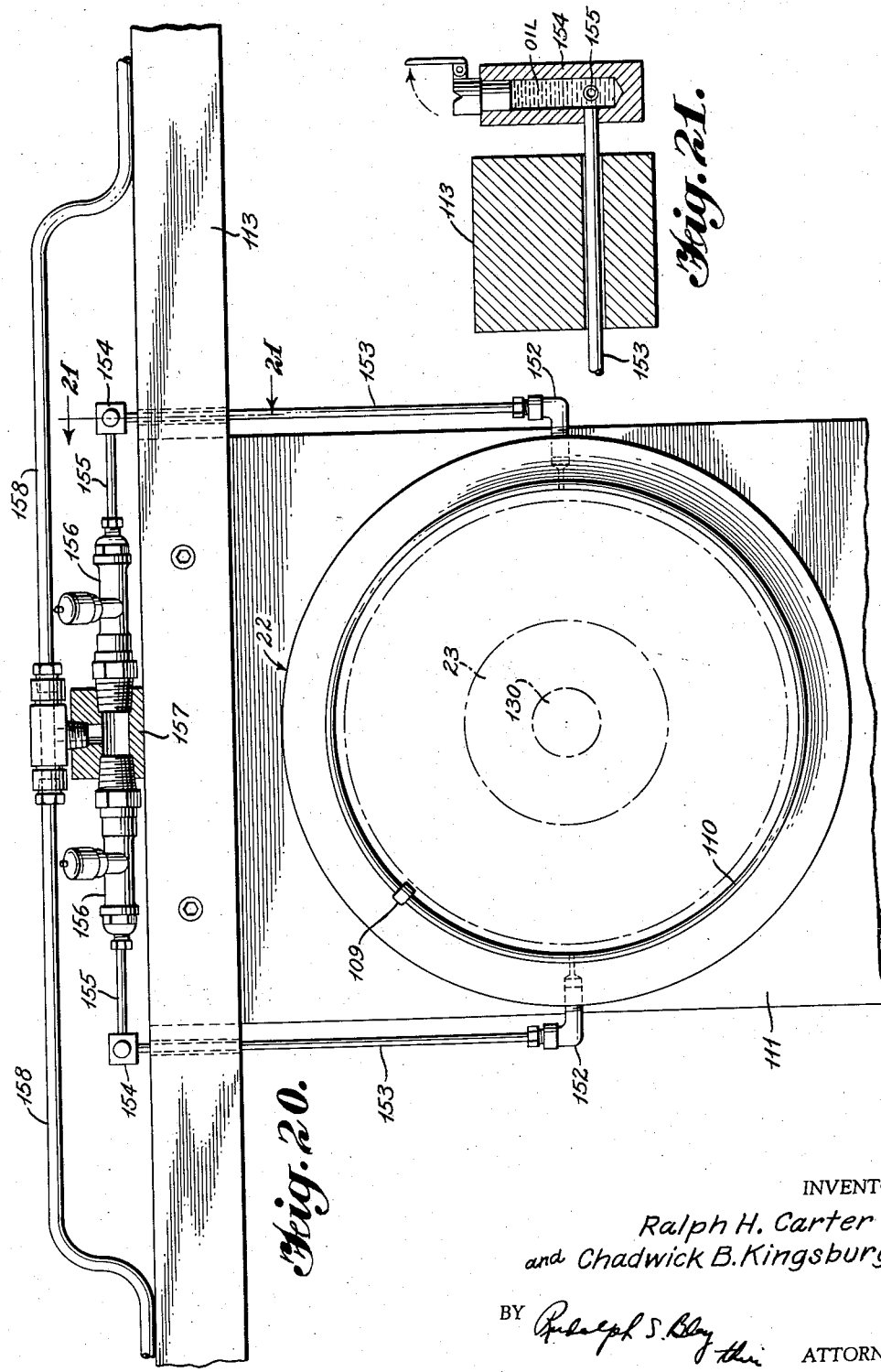

April 14, 1959   R. H. CARTER ET AL   2,881,584
METHOD APPARATUS FOR PLYING AND CABLING YARN
Filed April 13, 1956   25 Sheets-Sheet 13

INVENTORS
Ralph H. Carter
and Chadwick B. Kingsbury

BY Rudolph S. Bley
their ATTORNEY

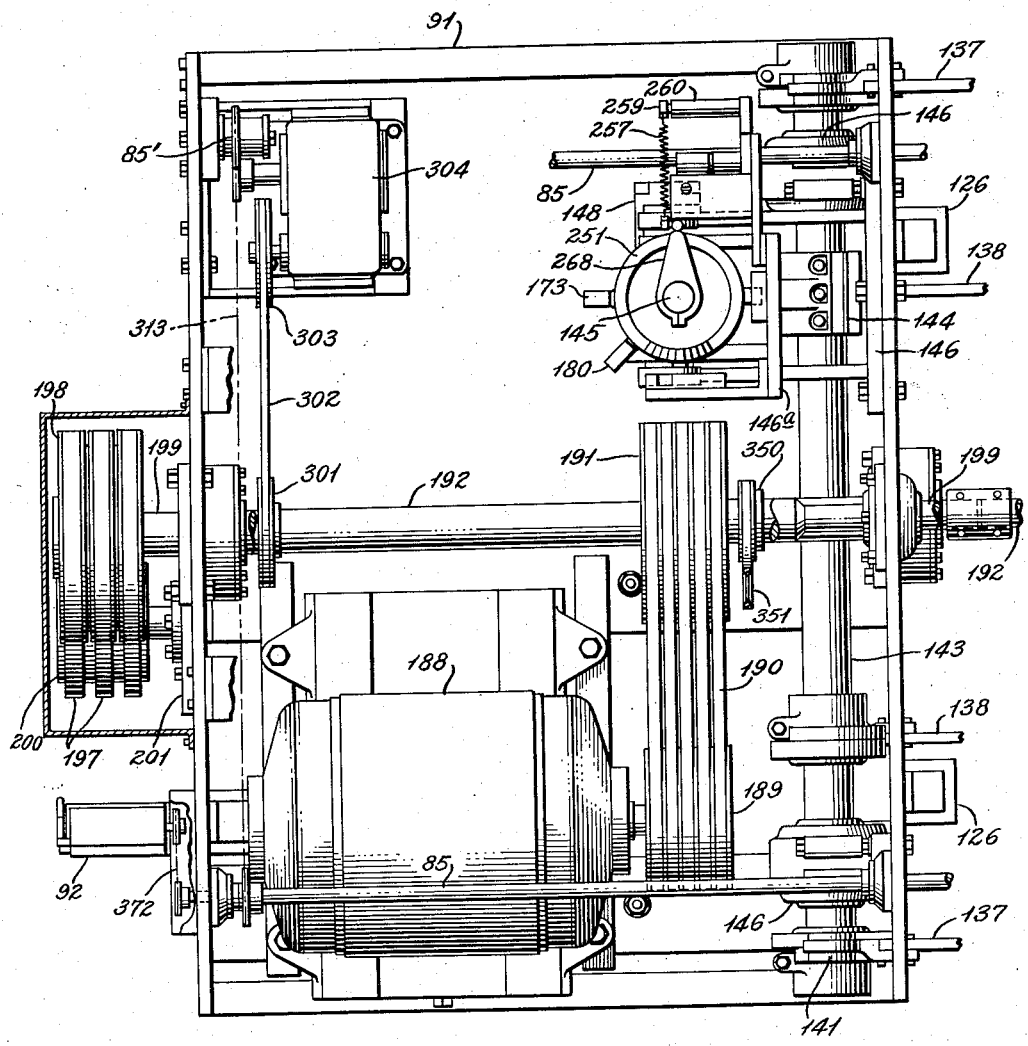

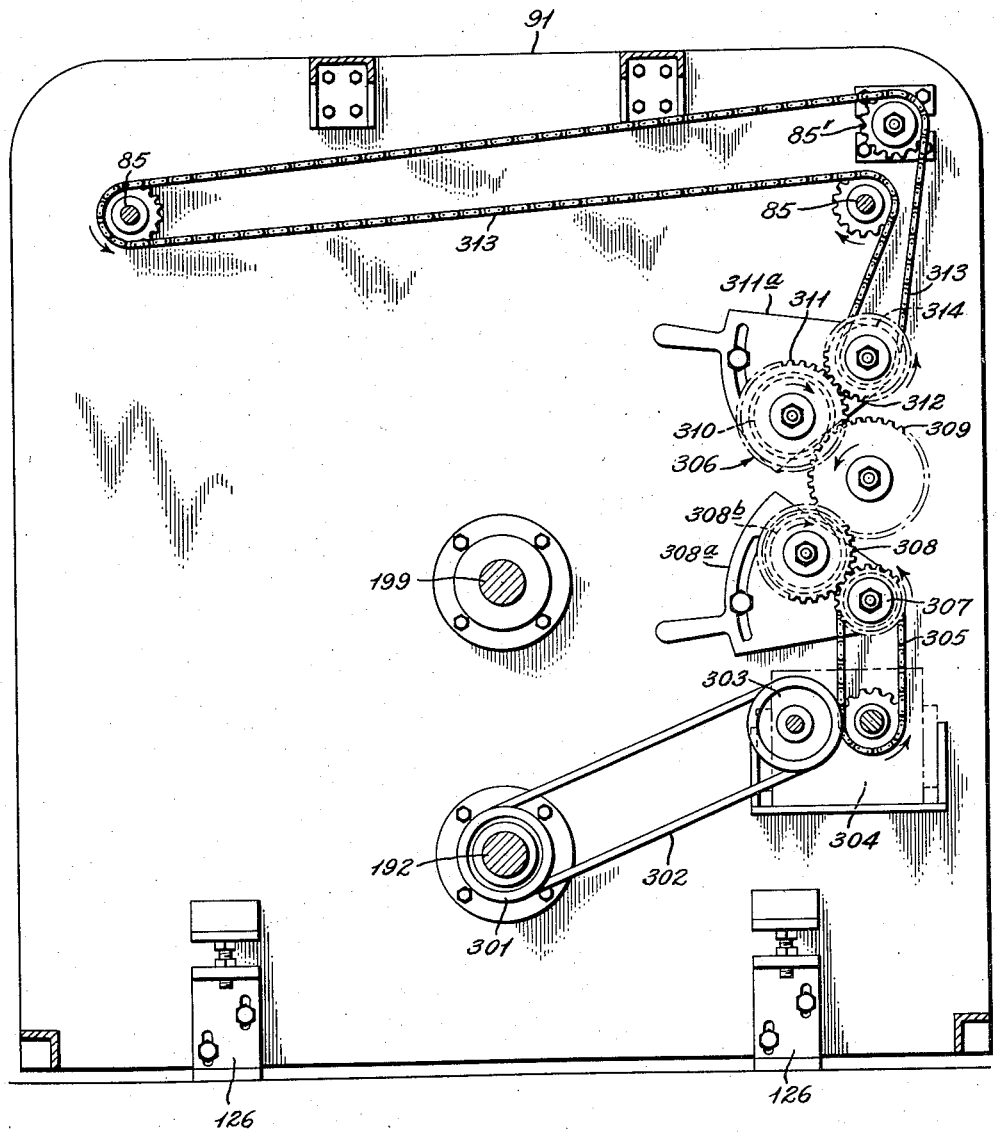

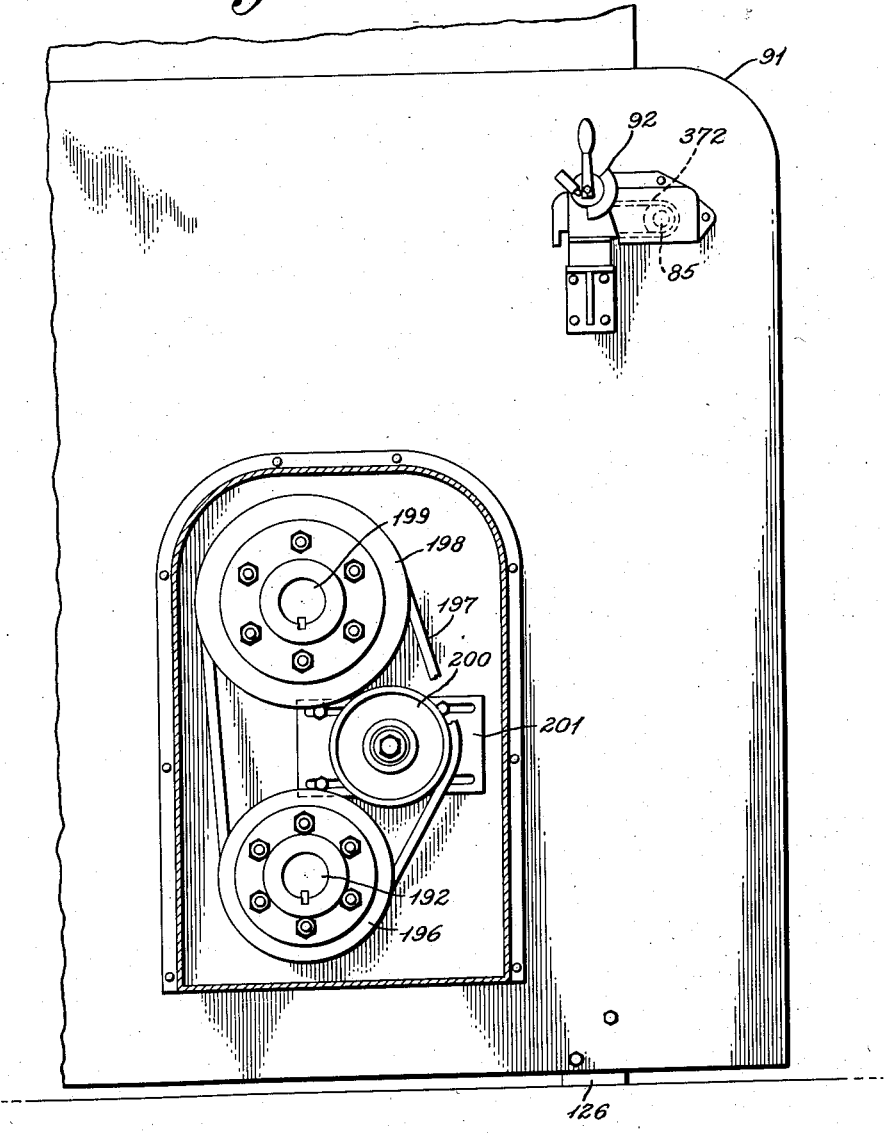

April 14, 1959 R. H. CARTER ET AL 2,881,584
METHOD APPARATUS FOR PLYING AND CABLING YARN
Filed April 13, 1956 25 Sheets-Sheet 18

INVENTORS
Ralph H. Carter
and Chadwick B. Kingsbury
BY
ATTORNEY

April 14, 1959 R. H. CARTER ET AL 2,881,584
METHOD APPARATUS FOR PLYING AND CABLING YARN
Filed April 13, 1956 25 Sheets-Sheet 20

INVENTORS
Ralph H. Carter
and Chadwick B. Kingsbury
BY
ATTORNEY

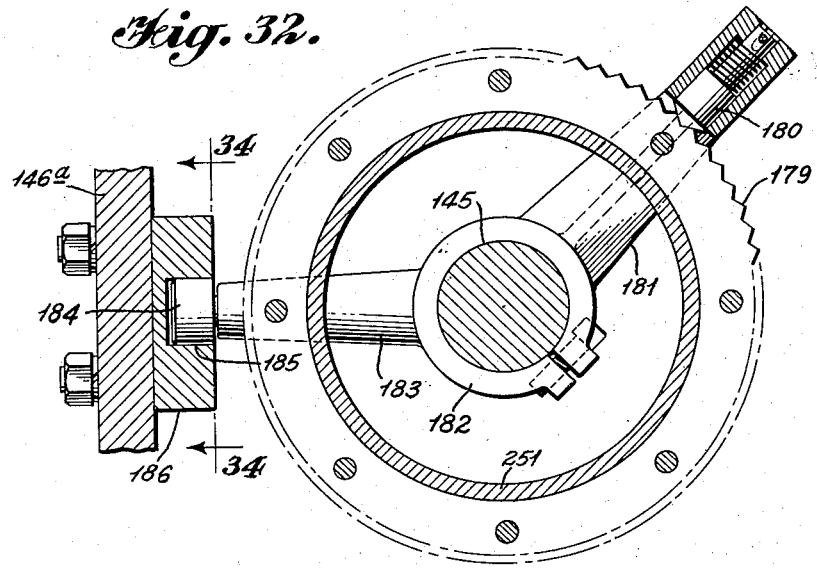
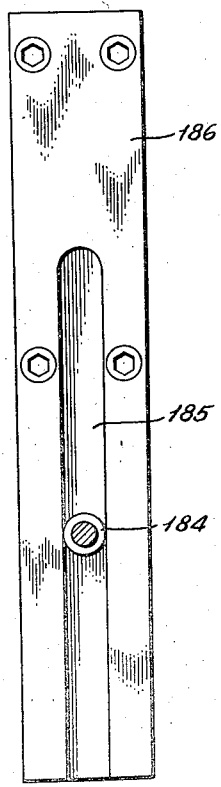
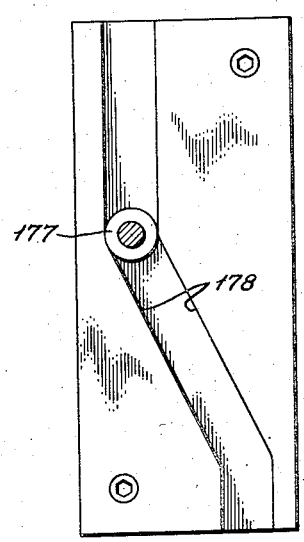

April 14, 1959   R. H. CARTER ET AL   2,881,584
METHOD APPARATUS FOR PLYING AND CABLING YARN
Filed April 13, 1956   25 Sheets-Sheet 22

INVENTORS
Ralph H. Carter
and Chadwick B. Kingsbury

BY
ATTORNEY

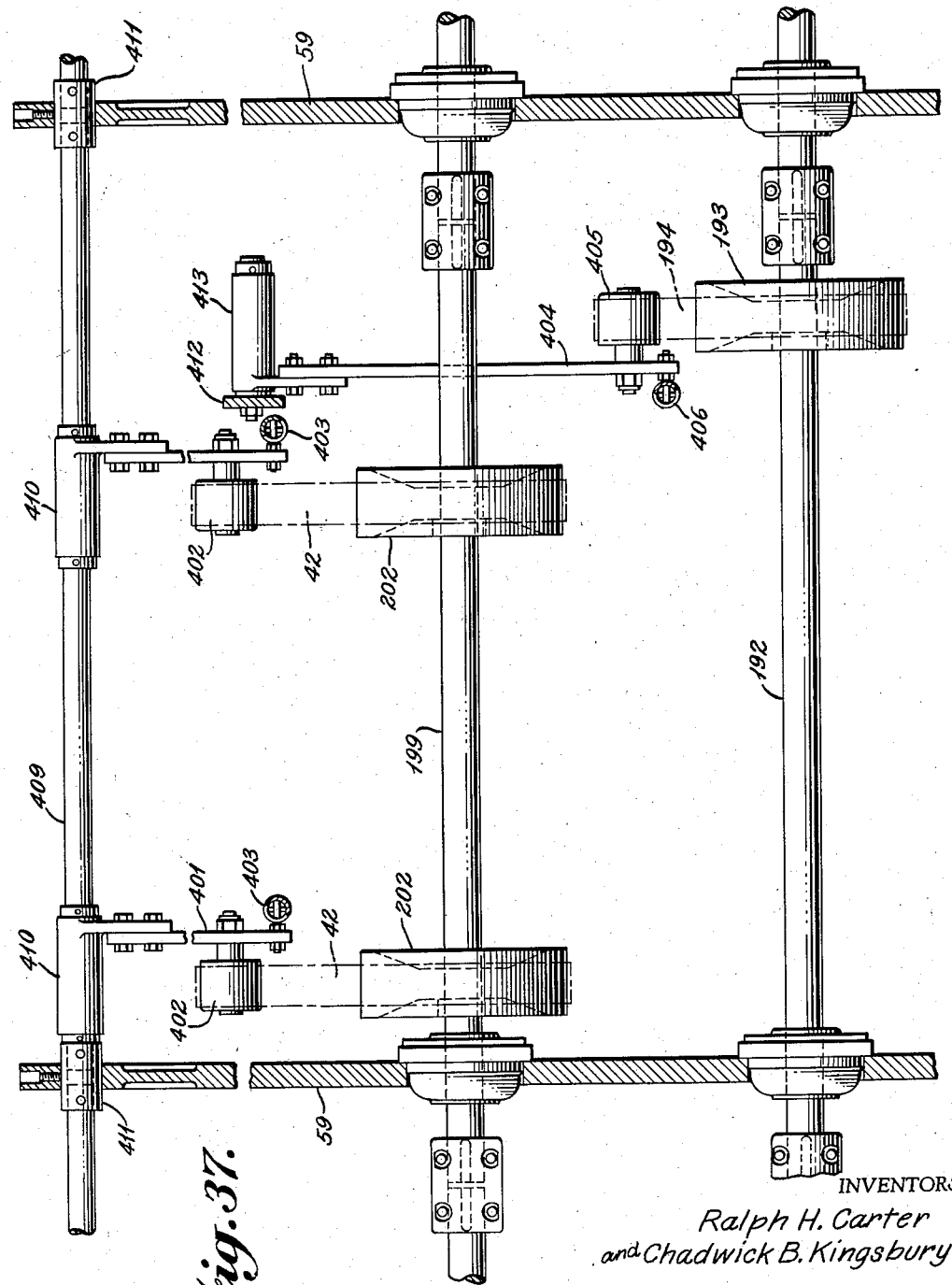

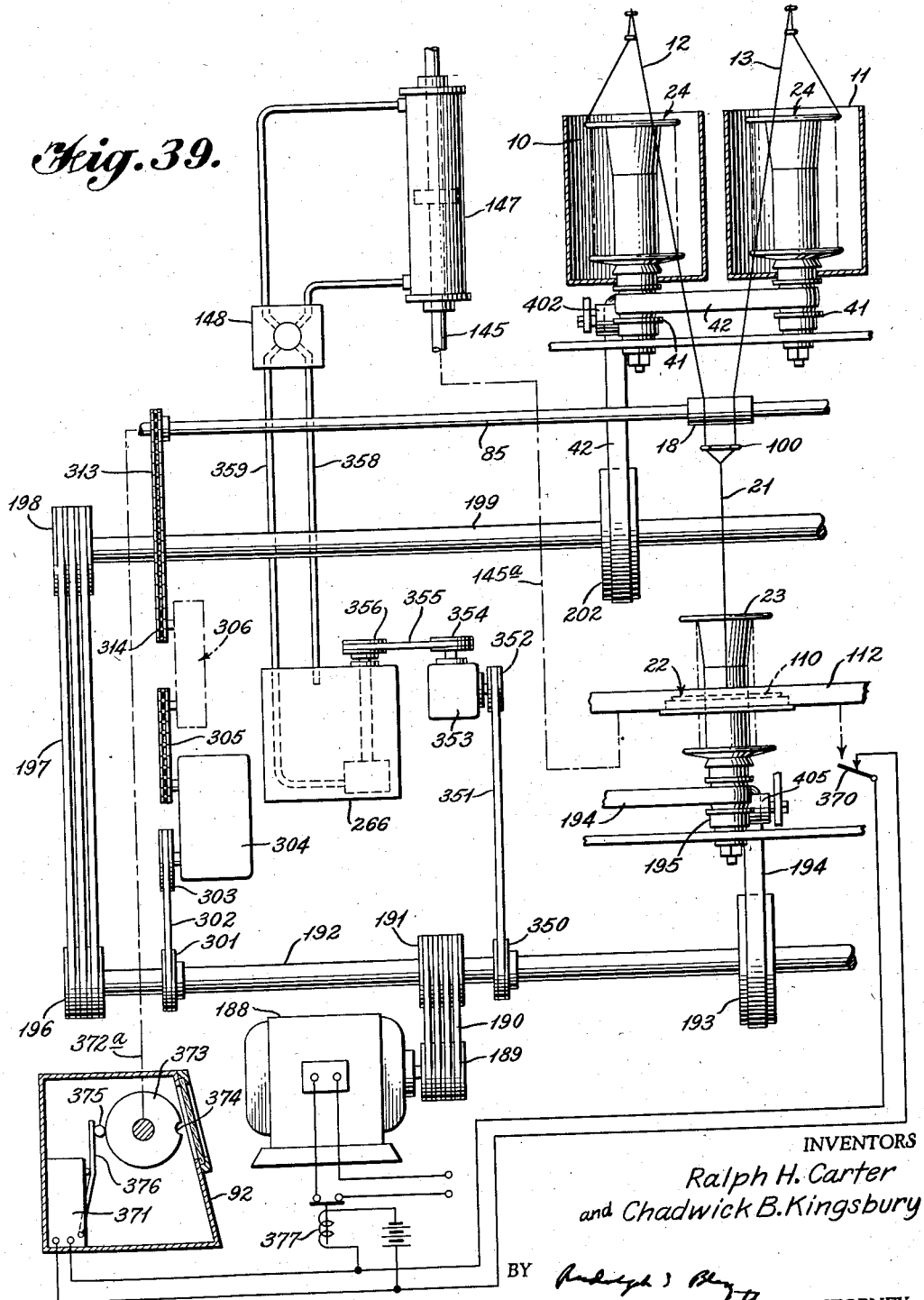

United States Patent Office 2,881,584
Patented Apr. 14, 1959

2,881,584

METHOD AND APPARATUS FOR PLYING AND CABLING YARN

Ralph H. Carter, Johnson City, and Chadwick B. Kingsbury, Elizabethton, Tenn., assignors to North American Rayon Corporation, New York, N.Y., a corporation of Delaware Application April 13, 1956, Serial No. 578,134

11 Claims. (Cl. 57—61)

This invention relates to an apparatus and method for ply-cabling of yarn for the production of cord, for example, cord suitable for use in tires.

An object of this invention is to provide an improved ply-cabling machine that inserts twist into the individual ply yarns and also inserts twist into the cable made from the ply yarns, said machine being characterised by the ease with which it may be threaded up.

Another object of this invention is to provide an improved ply-cabling machine that inserts twist into the individual ply yarns and into the resulting cable in such a way that uniform cable twist is produced and the cable is free of any corkscrew effect or appearance with the result that fabric woven from the cable is stronger and more uniform.

Still another object of this invention is to provide an improved method and apparatus for cabling yarn for producing tire cord having improved fatigue characteristics.

Another object of this invention is to provide an improved method and apparatus for cabling yarn for producing tire cord ready for the loom from low twist, single end yarns in one operation.

Still another object of this invention is to provide an improved ply-cabling machine in which yarn ends are individually ply-twisted and individually fed by a common feed roller mechanism under tension to individual yarn guides from which the twisted yarn ends are fed to a yarn combining guide and to the ring twister where the ply ends are twisted into a cable ready to be used in weaving a fabric.

Other and further objects will be apparent to those skilled in the art to which this invention relates from the following specification and claims.

The apparatus and method of this invention are improvements over existing machines of the type disclosed in U.S. Patent No. 2,343,299 of Kline, for example. In accordance with this invention there is provided an apparatus and method of plying and twisting several yarn ends to produce twisted cord such as is suitable for tire fabric, said cord having improved fatigue and strength characteristics.

This apparatus is constructed in such a way that it may be easily threaded up and means are provided for controlling the twist in the cord so that a highly uniform cord may be produced. This is also enhanced by the arrangement employed for individually twisting the ply ends in one direction and individually feeding said ply ends to yarn guides which maintain the yarn ends separated up to a short distance above the ring twister spindle which forms the cord by twisting the ply ends in the opposite direction. Through the agency of the arrangement of the ply twist spindles, yarn guides and feed roller of this invention the ply ends are fed to the cable twist spindle with uniform tension. This allows the formation of a cable containing uniform ply lengths and thus reduces to a minimum any tendency toward cork screwing and uneven twist insertion. This results in the production of cable having superior twist uniformity.

Referring to the drawings briefly:

Fig. 4 is a plan view of a flier employed on the bobbin shown in Fig. 3;

Fig. 5 is a sectional view taken along the line 5—5 of Fig. 4;

Fig. 6 is a sectional view taken along the line 6—6 of Fig. 5;

Fig. 7 is a plan view of the manual brake employed on the spindle shown in Fig. 3;

Fig. 8 is a side view partially in section of one of the feed roller assemblies;

Fig. 9 is a sectional view along the line 9—9 of Fig. 8;

Fig. 16 is a side view of part of the twister ring traverse;

Fig. 17 is a side view of another part of the twister ring traverse;

Fig. 20 is a plan view of the oiling system of one of the twister rings;

Fig. 21 is a sectional view along the line 21—21 of Fig. 20;

Fig. 24 is a plan view of the drive mechanism;

Fig. 25 is a side view of the drive employed for the feed rollers of this apparatus;

Fig. 27 is a view of a pulley arrangement employed in the drive mechanism;

Fig. 32 is a sectional view along the line 32—32 of Fig. 30;

Fig. 34 is a side view of a slotted guide employed in the hydraulic traverse;

Fig. 35 is a side view of the cam for rotating the rotatable disc and cam of the hydraulic traverse;

Fig. 37 is a sectional view taken along the line 37—37 of Fig. 2;

Fig. 39 is a schematic drawing of the entire power transmitting arrangement employed for driving the ply twist spindles, feed rollers, ring twister traverse and spindles as well as the electric circuit controlled by the yardage counter.

Figure 1:
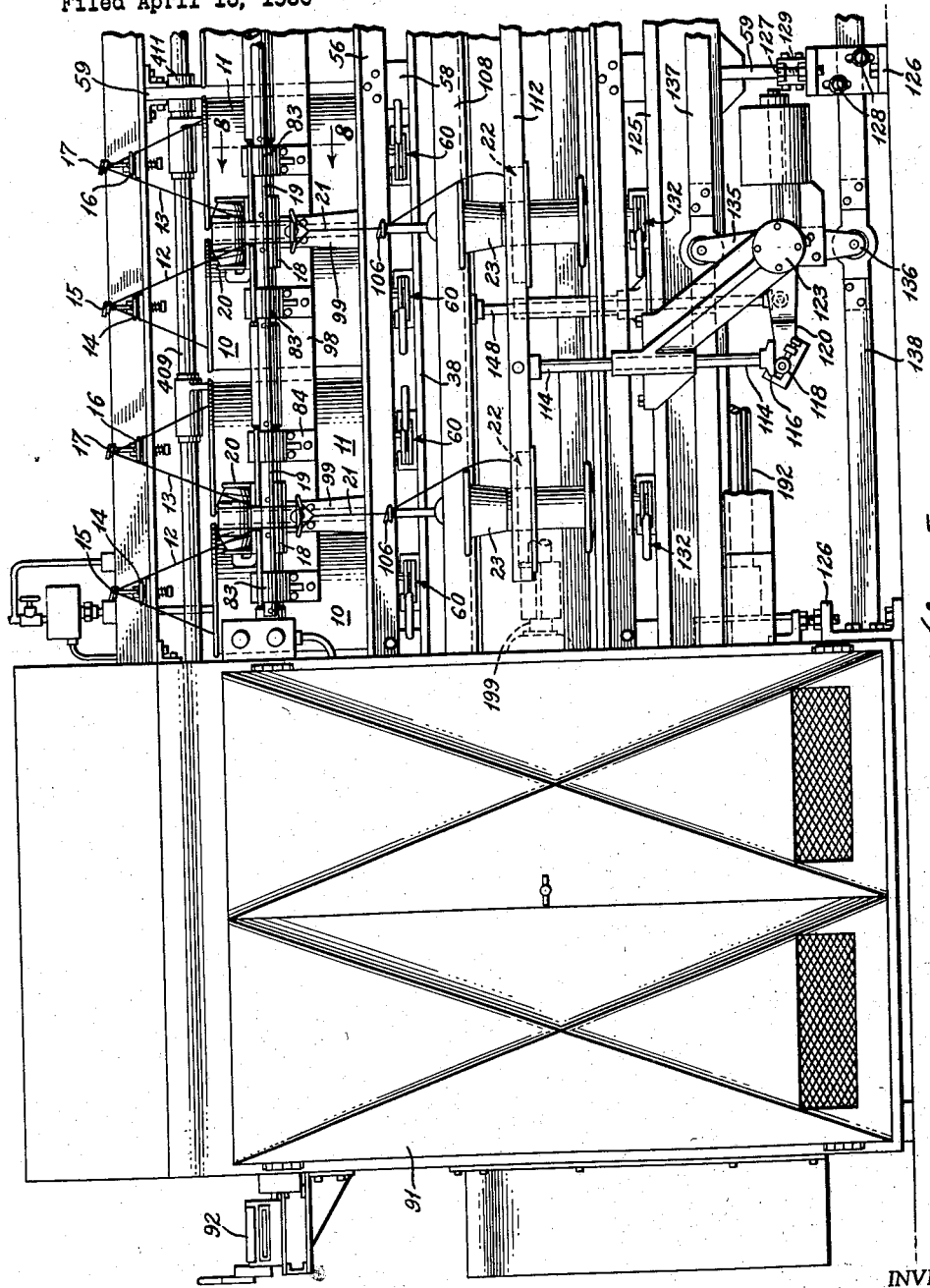
Fig. 1 is a side view of part of the machine of this invention.
Figure 2:
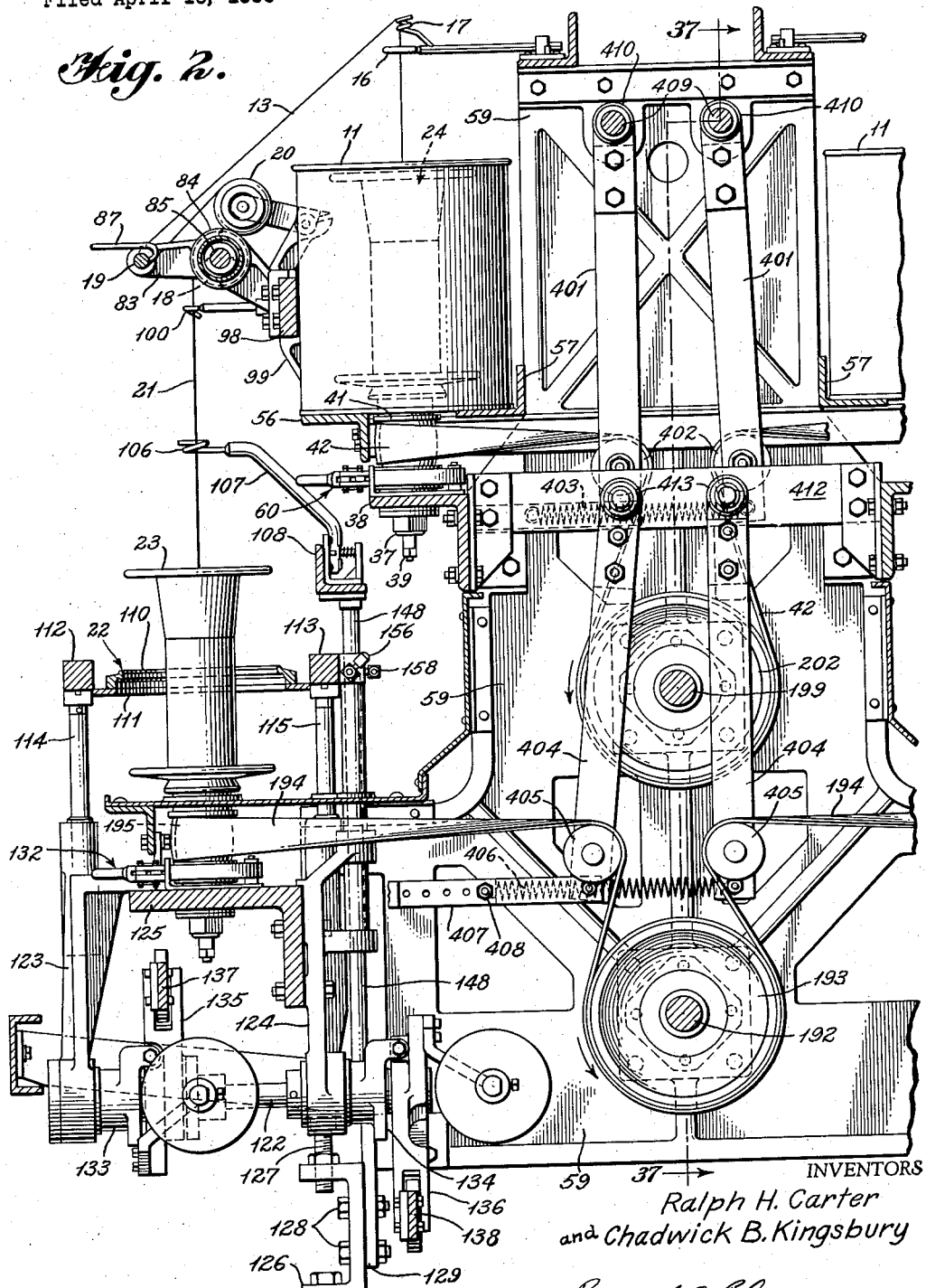
Fig. 2 is a sectional view taken across the machine of this invention.

Referring to Fig. 1 of the drawing there is illustrated a side view of two positions of this machine showing two pairs of buckets 10—11 enclosing ply twist spindles and bobbins. Ply twist is inserted into the yarn ends by rotation of the ply twist spindles and thence the yarn ends 12—13 from said bobbins are individually led to feed rollers 18—20 through suitable guides. From the feed rollers 18—20 the ply ends travel through splitter guides beyond which the two ply ends are combined. The cable 21 results from the union of the ply ends and twist inserted therein by the ring twister spindle and the twisted cable is collected on the bobbin 23 as a finished cord. The frame members and general layout of the different elements employed for twisting and plying of the yarn ends in accordance with this invention are shown in Figs. 1 and 2. The various elements of this apparatus are shown in detail views which will be described in detail hereinafter.

In this apparatus two yarn ends 12—13 which are wound on bobbins that are positioned in the buckets 10 and 11 are used to form a cord. However, more than two yarn ends may be twisted together into a cord if desired. One of the buckets, bobbins and spindles employed in accordance with this invention is shown in section in Fig. 3. The bobbins and spindles in these buckets are the same and therefore only the bobbin and spindle that are positioned in bucket 10, are illustrated in detail in Fig. 3. The buckets 10 and 11 are open at the top so that the ply ends may be removed from the bobbins positioned therein. Thus the ply end 12 from the bobbin in bucket 10 is twisted and passed upward through the thread guides 14 and 15 positioned above the bucket 10 and the ply end 13 from the bobbin positioned in the bucket 11 is twisted and passed upward through the thread guides 16 and 17 positioned above the bucket 11.

The bobbin 24 is provided with a top flange 25 and a bottom flange 26 between which are positioned the cylindrical elements 27 and 28. The cylindrical, hollow tube 27 rests in a groove formed in the upper surface of the flange 26 and the tapered cylindrical element 28 is provided with a shoulder that fits into the top of the tube 27. A web 29 is provided inside of the cylindrical element 28 and the upper end of the metal tube 30, that extends through the bobbin for the purpose of holding the elements 27 and 28 together, is spun or bent over this web. The lower end of the tube 30 is likewise spun or bent into a groove formed in the lower part of the flange 26.

The upper end of the tapered cylindrical element 28 fits into a groove formed in the underside of the top flange 25 and suitable screws are provided to hold this flange in place on the top of the elements 28. A hole is formed in the center of the flange 25 and a metal insert 31 is positioned in this hole. This metal insert is provided with an inwardly projecting flange that serves to hold the nylon bearing member 32 of the flier as will be described hereinafter.

The rod 33 which supports the bearings of the spindle, extends up through the spindle and the bobbin. The lower end of this rod is threaded into the sleeve 34 which is threaded into the flange member 35, a part of which extends into a hole formed in the frame member 38. A second flange member 36 is provided below the member 35 and the nut 37 that is threaded to the sleeve 34 is employed for clamping the frame member 38 between these flange members 35 and 36 so that the sleeve 34 is rigidly held on the frame member 38.

The lower end of the rod 33 is of reduced size and is provided with threads fitting the nut 39. This nut abuts the lower end of the sleeve 34 and presses the upper end of this sleeve against the lower end of the inner race of the ball bearing assembly 40. The upper end of this race is thus forced against a shoulder formed on the rod 33 and this race is thereby held firmly on the rod 33. The outer race of the ball bearing assembly 40 is firmly held in the whorl 41 that is driven by the belt 42, for the purpose of rotating the spindle sleeve 47 and the bobbin 24. The bottom flange of the bobbin rests on the top of this whorl and is keyed thereto by radial ridges 43 that are integral with the whorl and fit into corresponding recesses formed in the bottom of the flange 26 of the bobbin.

The inner race of the bearing assembly 44 is firmly held on the upper end of the rod 33 by the nut 45 which presses the lower end of this race against a shoulder formed on the upper part of this rod. The outer race of the bearing assembly 44 is fitted into a cavity formed in the lower end of the member 46 which is tapered and terminated by a portion of reduced size that fits into and projects out of the top of the nylon bearing member 32 of the flier 48.

The upper part of the sleeve 47 is frictionally fitted over the bottom part of the member 46 and this sleeve is positioned inside of the sleeve 30 of the bobbin. The bottom part of the sleeve 47 extends beyond the sleeve 30 and is frictionally fitted into the inside of the upper part of the whorl 41. Thus the sleeve 47 forms the body portion of the spindle that is rotatably supported by the bearing assemblies 40 and 44 on the rod 33 and the upper and lower portions of this sleeve 47 are made of diameters such that these portions fit closely into the upper and lower parts of the sleeve 30. The bobbin 24 through the agency of its sleeve 30 therefore fits closely on the spindle and the flange 26 of the bobbin rests on the whorl 41.

Figure 3:
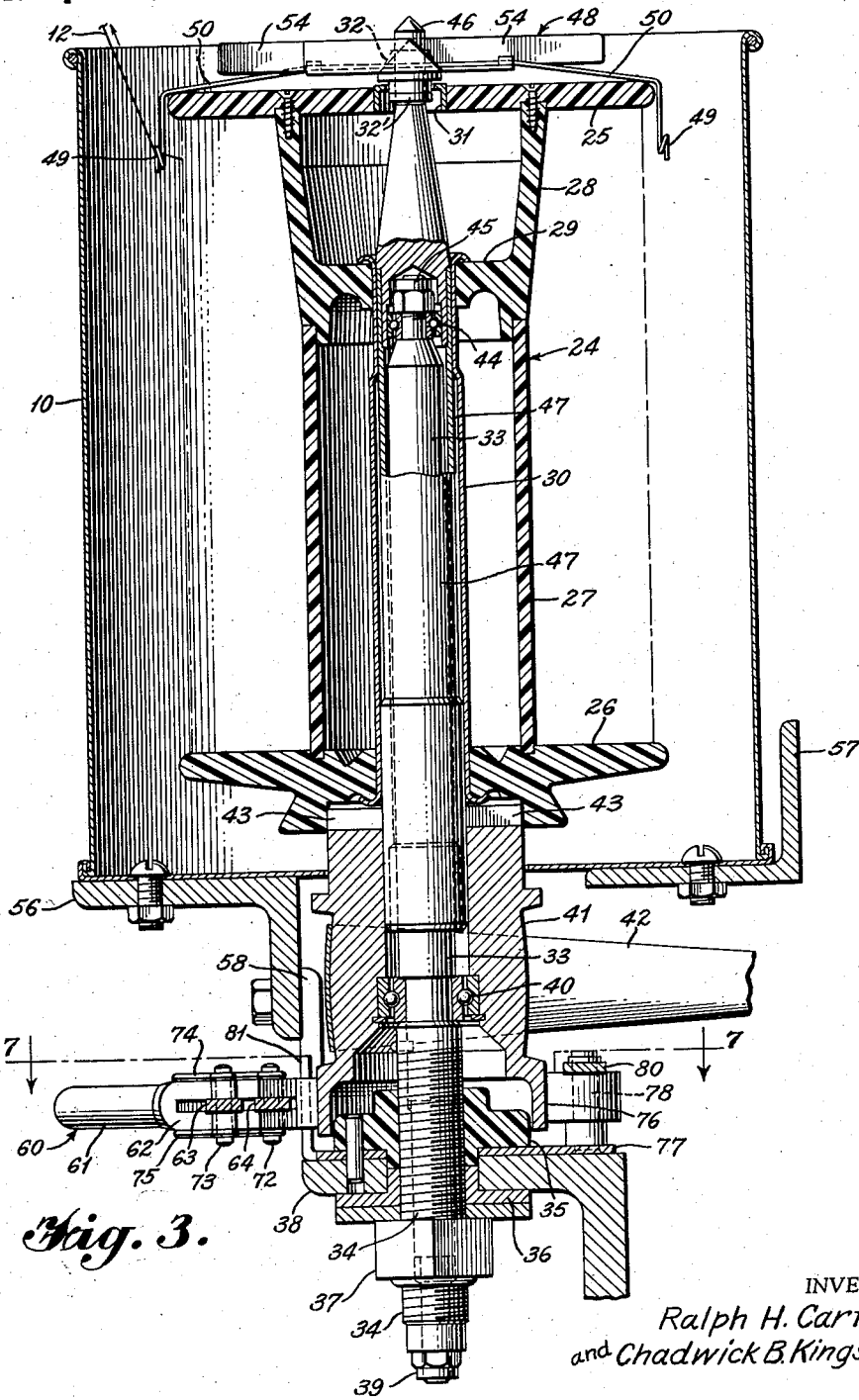
Fig. 3 is a sectional view of one of the spindles and bobbins associated therewith employed on this apparatus.

Suitable fliers 48 as shown in Fig. 3 are positioned on the tops of the yarn bobbins in the buckets 10 and 11. The yarn end that is taken off of the bobbin 24, for example, is passed through one of the loops 49 that are formed at the free ends of the flier wires 50. The inner ends of these wires 50 pass around a portion of the flier bearing member 32 as shown in Figs. 4, 5 and 6 and through notches 51 formed in the flier body member 52 adjacent to the hole 53 in which the bearing member 32 is lodged. The notches 51 are formed on diametrically opposite sides of the large hole 53 which is made large enough so that the bearing member 32 may be inserted therein and this bearing member is provided with a groove 53' into which portions of the wires 50 are lodged as shown in Fig. 5 so as to hold the bearing in place on the body of the flier. The wires 50 are made of spring material so that when the inner ends thereof are inserted into the notches 51 as shown in Fig. 6 and the wires are brought around the sides of the bearing member 32, they apply suitable pressure to the latter member and lock it in place. The wires 50 also press against the upturned sides 54 of the body member 52 and they are held in place thereagainst by small tongues 55 that are formed integral with the body member 52. These tongues are bent around the wires 50 and clamp the wires against said body. The upturned portions 54 of the body extend beyond the tongues 55 and form vanes which tend to slow down the rotation of the flier when it is in operation.

The bearing member 32 of the flier is provided with a neck portion that extends into the collar 31 that is positioned in the top flange 25 of the bobbin as shown in Fig. 3. This neck portion is provided with a projecting portion 32' as shown in Fig. 5 that extends under the inwardly extending flange of the metal insert or collar 31.

As previously mentioned, the yarn end that is being taken off of the bobbin 24 is inserted into one of the loops 49 of the flier wires 50. When the yarn end is being removed from said bobbin the bobbin is rotated by means of the belt 42 that engages the whorl 41 of the spindle that supports said bobbin. The rotation of the bobbin and the removal of the yarn therefrom functions to lift the free end portions of the wires 50 out of contact with top surfaces of the bobbin flange 25. While the bobbin is at rest or traveling at slow speeds, the wires 50 are pressed against the top of the bobbin flange 25 as shown in Fig. 3, however, as mentioned, when the bobbin is traveling at high speeds, the flier also rotates and this causes the wires 50 to be lifted out of contact with the flange 25. Consequently, the flier may rotate at different speeds from the speeds of rotation of the bobbin. However, when the bobbin slows down, it is undesirable to permit the flier to rotate faster than the bobbin and accordingly, it is necessary also to slow down the flier. The vane portions 54 of the flier 48 function to produce this result and when the resilient wires 50 come in contact with the flange 25 the drag produced thereby also assists in slowing down the flier and bring it to a stop substantially at the same time as the bobbin stops rotation.

The spindles for the bobbins that are positioned in the buckets 10 and 11 extend down through holes cut in the bottoms of these buckets. The whorls provided to these spindles extend down below the buckets for engaging a suitable belt whereby the spindles may be rotated as previously explained. These buckets are attached by suitable bolts to the angle iron frame members 56 and 57 as shown in Figs. 2 and 3. The frame member 56 is supported by brackets 58 on the angle iron member 38 which is one of the longitudinally extending members of the main frame and as such it is bolted to each of the cross members 59 of the machine. The member 57 is also a longitudinally extending frame member and it is bolted directly to the cross members 59.

Manually operated braking devices 60 are supported beneath the buckets on the angle iron member 38 and one of these braking devices is shown in detail in Figs. 3 and 7.

Each of the spindles for the bobbin is provided with one of these manually operated brakes for the purpose of stopping the rotation of a spindle and associated yarn bobbin when it is desired to bring the spindle to a stop for loading, unloading, servicing or examination. The brake comprises a handle 61 that is provided with a forked portion 62 having blades 63 and 64 positioned between the forks thereof. These blades are provided with slots 65 and 66 respectively, near one of the ends thereof. The other ends of these blades 63 and 64 are fixedly attached to the ends of the brake shoes 67 and 68 respectively, by means of the bolts 69 and 70, respectively. These blade members are spaced apart a sufficient distance so that the bolt 71 of the forked portion 62 of the brake lever may pass through this space so as to retain the brake lever in position on the blades 63 and 64. Suitable pins such as the pins 72 and 73 are attached to the blades 63 and 64 respectively, and these pins are positioned so as to engage the sides of the forked member 62. Springs 74 and 75 are attached to the corresponding ends of the pins 72 and 73 and these springs function to press the aforesaid pins against the sides of the forked member 62. These springs also function to urge the brake shoes 67 and 68 out of engagement with the braking surface 76 of the whorl during its normal operation as will be described hereinafter.

The brake shoes 67 and 68 are of arcuate construction. One end of each of these shoes is pivoted to the top surface of the plate 77 which is clamped to the top of the angle iron member 38 by means of the members 34, 35 and 36. Pivot pins 78 and 79 are provided for this purpose as shown in Fig. 7 and a bracing member 80 extends between these pivot pins over the end portions of the brake shoes 67 and 68.

When it is desired to stop the rotation of the spindle shown in Figs. 3 and 7, for example, the brake lever 61 is moved to the right so that the forked portion 62 of the brake applies pressure to the pins 72 and 73 and moves the blade 63 to the right and the blade 64 to the left. Since the blade 63 is attached to the end of the brake shoe 67 by the means of the bolt 69 and the blade 64 is attached to the brake shoe 68 by means of the bolt 70, this operation of a lever 61 moves the aforesaid brake shoes into engagement with the surface 76 of the whorl against the tension of the springs 74 and 75, to stop this spindle. As soon as the lever 61 is released, these springs function to move the brake shoes out of engagement with the brake surface. The limit of the latter motion of the brake shoes 67 and 68 is determined by the stop members 81 and 82 which are formed by upturned portions of the plate member 77.

Figure 12:
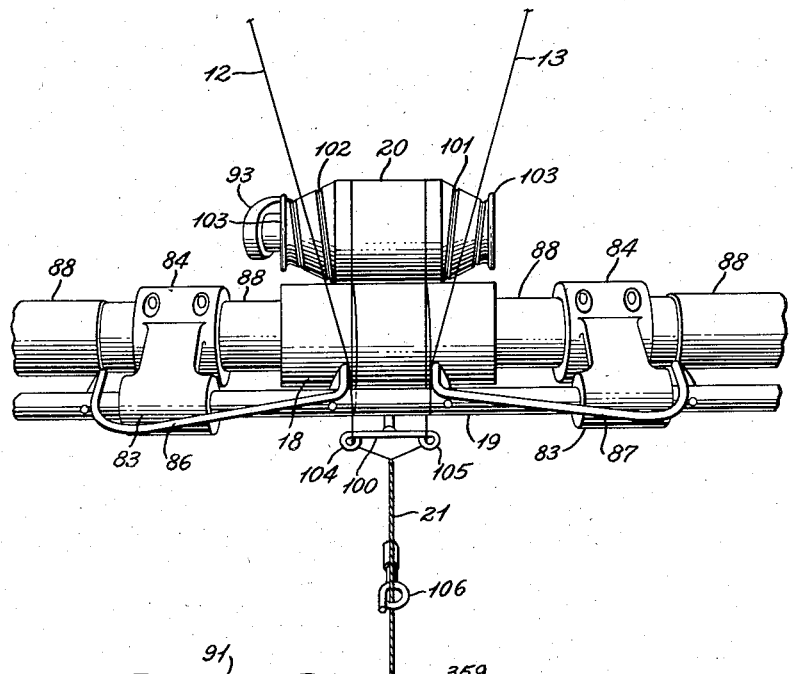
Figure 26:
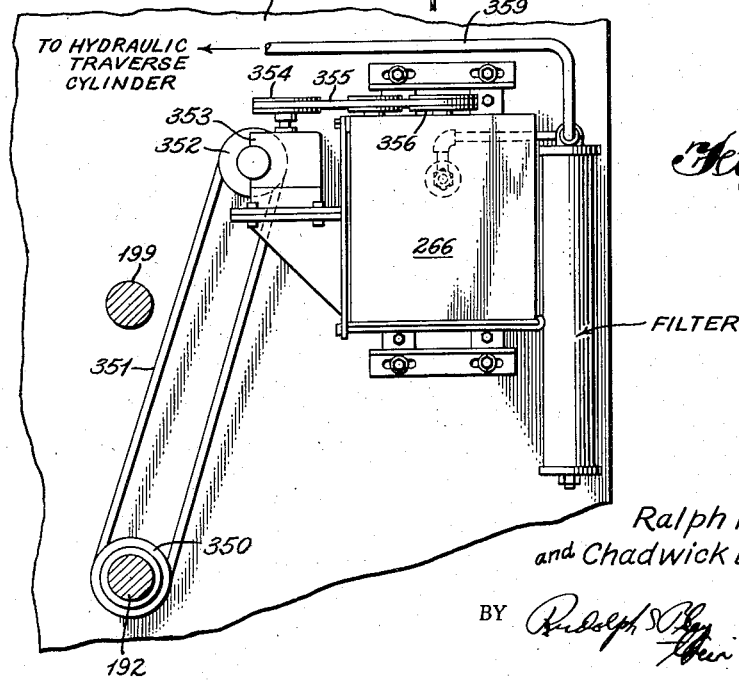
Fig. 26 is a side view of the pump mechanism for supplying fluid to the hydraulic traverse.

To the front of the driven roller 18 is mounted a yarn guide rod 19 as shown in Fig. 8 and this rod is supported by the arms, such as, arm 83 extending from the supports 84 which support the shaft 85 shown in Fig. 9. The rod 19 also supports a pair of wires 86 and 87 substantially in front of each pair of feed rollers as shown in Fig. 12 and these wires are inclined in opposite directions with respect to the rod 19 and with respect to each other for the purpose that will be explained hereinafter. The ends of these wires 86 and 87 are held by suitable set screws in holes formed in the rod 19.

The shaft 85 passes through a series of short tubes 88 that are supported by the members 84, selected ones of which also support ball bearing assemblies 89 as shown in Fig. 9. Couplings 90 are provided between adjacent ends of the shaft 85 which may consist of short lengths of shafting so that it may be disassembled more readily. This shaft extends over the length of the machine and through the motor cabinet 91 shown in Figs. 1 and 24 to drive the yardage counting device 92.

The roller 20 is pivotally mounted on the arm 93 that is pivoted on the bracket 94 as shown in Fig. 8 so that this roller may be lifted manually off of the driven roller 18. A ball bearing assembly 95 shown in Fig. 9 is provided inside of the feed roller 20 for supporting this roller on the shaft 96. The arm 93 is formed with an extension 97 that extends into the hollow inside of the roller 20 and the shaft 96 extends through a hole drilled through the center of this extension 97 to engage the inner race of the ball bearing assembly 95. The outer race of this assembly is fitted into the hollow of the roller 20 substantially in the center thereof and it is held clamped therein by suitable spring members.

The brackets 84 and 94 are attached to the frame member 98 by suitable bolts and this frame member is supported by brackets 99 upon the angle iron member 56. The brackets 99 also support the dual thread guides 100.

Figure 10:
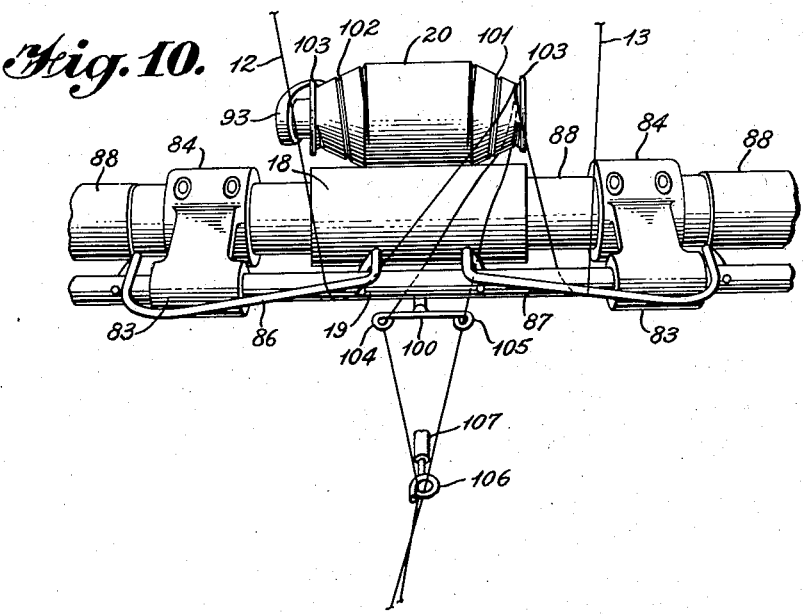
Figs. 10, 11 and 12 are views of the feed roller to illustrate how the yarns ends are threaded thereon.
Figure 11:
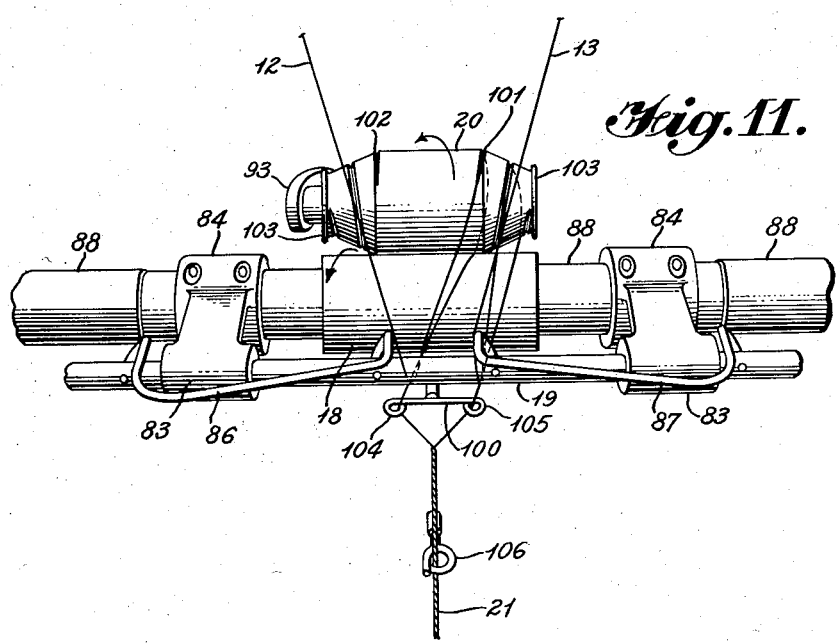

In Figs. 10, 11 and 12 there is illustrated a series of positions that are assumed by the yarn ends as they automatically seek their running positions on the feed rollers 18 and 20. The yarn ends 12 and 13 from the bobbins in the buckets 10 and 11 are passed through the yarn guides 14—15 and 16—17 above the buckets 10 and 11, respectively, and from these guides the yarn ends are passed over the front of the wires 86 and 87 and under the rod 19. Thereafter the yarn ends are hooked over one end of the roller 20 as shown in Fig. 10. Both end portions of this roller 20 are tapered and provided with spiral grooves, one tapered end portion being provided with the helical groove 101 and the other tapered end portion being provided with the helical groove 102. These helical grooves start at the small end flanges 103 of this roller and spiral up to the respective ends of the cylindrical middle portion of the roller. These grooves spiral in the opposite directions, said directions being such that the yarn ends entering a groove at one end next to the corresponding end flange of the roller are moved through this spiral groove of the rotating roller up to the cylindrical portion of the roller as shown in Figs. 11 and 12. At the same time the yarn ends slide on the angularly disposed wires 86 and 87 until they slide off of these wires and upon the portion of the rod 19 that is aligned with the cylindrical part of the roller 20 as shown in Fig. 12. In Fig. 11 one of the yarn ends is also shown after it has been transported through the groove 101 and is passing onto the cylindrical part of the roller. In Fig. 12 the yarn ends are shown properly positioned on the roller 20.

Figure 13:
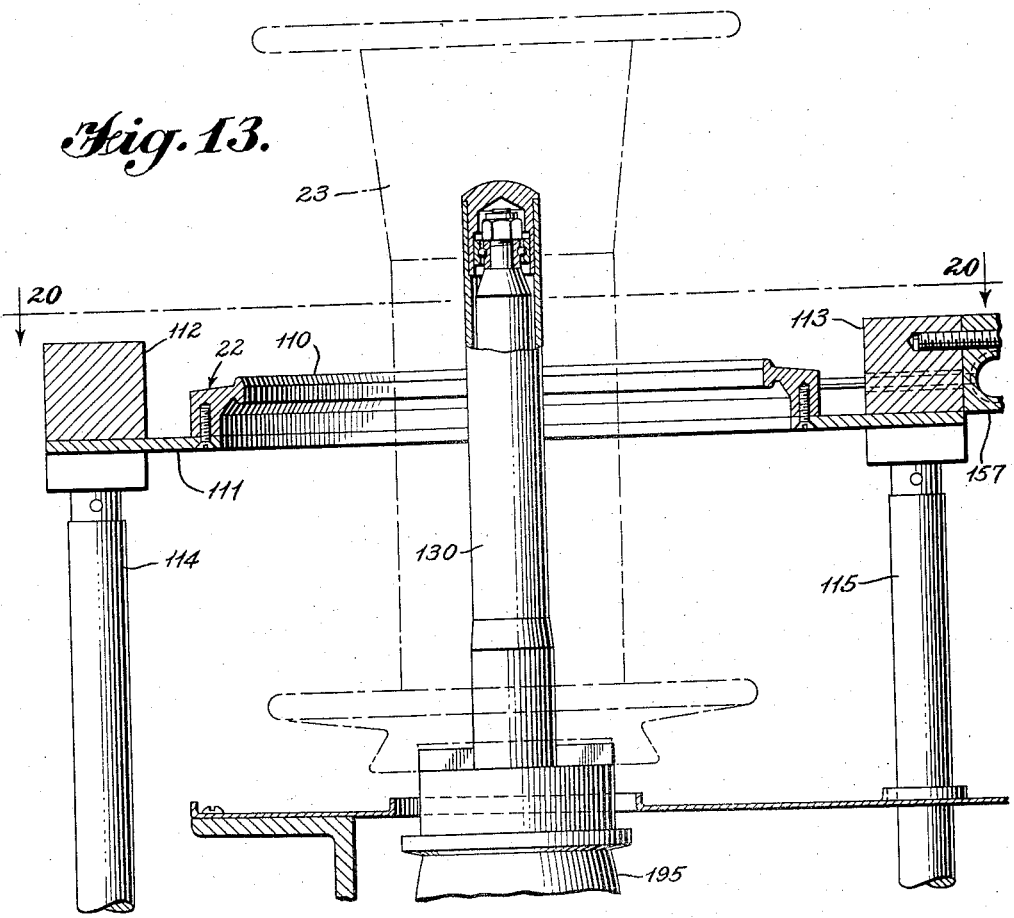
Fig. 13 is a sectional view of the ring twister employed in accordance with this invention.

Below the roller 18 is provided a dual thread guide 100 that comprises two wire loops 104 and 105 spaced apart a short distance and attached to a common member which in turn is attached to the front of the bracket 99. The yarn ends 12 and 13 pass through these thread guides 104 and 105 and then are permitted to combine and form the cable 21 as shown in Fig. 12. The cable then passes through the thread guide 106 that is supported by the member 107 on the rail 108 which is supported on rods, such as, rod 148 as shown in Fig. 2. From the thread guide 106 the cable passes through the traveller 109, Fig. 14, of the ring twister. The ring 110 of this twister is supported by the plate 111 on the rails 112 and 113 which are attached to the top ends of the vertical rods 114 and 115, respectively, as shown in Fig. 13. The bottom ends of these rods are provided with shoes 116 and 117 which ride on the rollers 118 and 119 of the arms 120 and 121, respectively, as shown in Figs. 16 and 17. These arms 120 and 121 are supported on the rod 122 and keyed thereto so that they may be oscillated up and down about the rod 122 as a center.

The rods 114 and 115 slide in suitable sleeves that are positioned in holes formed in the cast iron bracket members 123 and 124, respectively, and these members are attached by bolts to the frame member 125. The frame member 125 is a longitudinally extending angle iron member similar to the member 38 and it is also firmly attached to the cross frame members 59 which are positioned at spaced points throughout the length of the machine. Below each cross member 59 there are positioned supports 126, one of which is shown in Figs. 1 and 2 and each of these supports is provided with a leveling bolt 127 that abuts a surface of the corresponding cross member 59 while the bolts 128 are tightened to firmly clamp the support 126 to the member 129 that extends from the bottom of the cross frame member 59.

The bobbin 23 which is similar to the bobbin positioned in the bucket 10, shown in Fig. 3, is supported by a spindle 130 as illustrated in Fig. 13. This spindle is also similar to the spindle shown in Fig. 3 except that the top thereof is provided with a blunt cap. A whorl 195 is provided to the bottom of this spindle and the whole spindle assembly is firmly attached to the angle iron frame member 125 in a manner similar to that in which the spindle shown in Fig. 3 is attached to the member 38. A brake 132 which is constructed the same as the brake shown in Fig. 7 is also provided to the spindle 130.

The ring 110 of the twister is moved up and down over the length of the cable receiving body of the bobbin 23 by the rods 114 and 115 which are moved up and down by the arms 120 and 121 that are illustrated in Figs. 16 and 17, respectively, as previously described. For this purpose these arms are provided with rollers 118 and 119, the positions of which may be adjusted on these arms to a limited extent by the bolts 118a and 119a respectively. The arms 120 and 121 are made integral with hubs 133 and 134, respectively, which engage the rods 122 with which these hubs and arms are adapted to be rotated as will be described hereinafter.

Additional arms 135 and 136 are provided with hubs at one of the ends thereof and these hubs are supported on the rod 122 and keyed thereto. The hubs 133 and 134 of the arms 120 and 121 are provided with projections 133a and 134a respectively, and bolts 133b and 134b are threaded into the projections respectively. The bolts 133b and 134b are arranged to abut the projections 135a and 136a of the arms 135 and 136 respectively, so that the arms 120 and 121 may be rotated clockwise when the arms 135 and 136 are rotated in this direction.

Rotation of these arms in this way functions to move the ring twister traverse rods 114 and 115 upward. At the same time the traverse rods 148 which are attached to the thread guide rail 108 are moved upward and cause the thread guides 106 that are positioned above the bobbins 23 to move upward a short distance during the upward traverse of the ring 110. The rods 148 are each provided with a shoe 149 that rides on the roller 150 that is attached to the arm 121 as shown in Fig. 17. The rods 148 slide in sleeves that are supported in bracket members such as the member 124.

Figure 18:
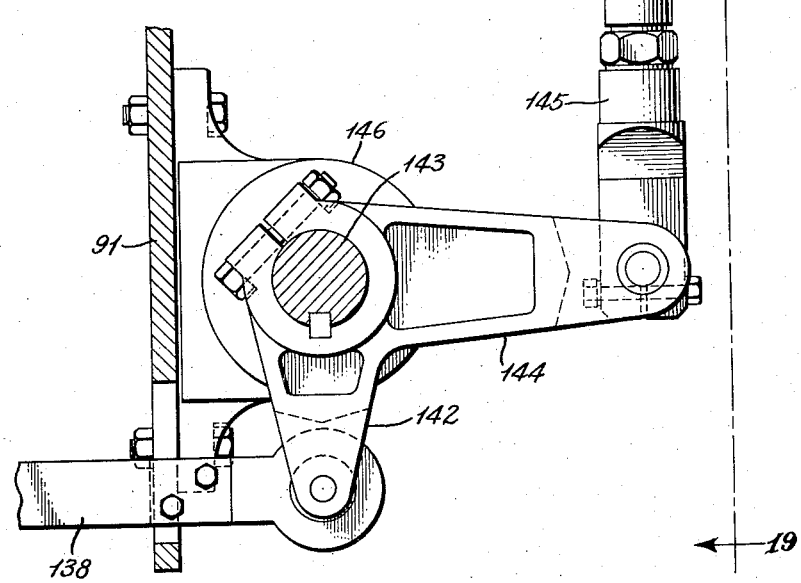
Fig. 18 is a side view of the crank mechanism for actuating one of the traverse bars.
Figure 19:
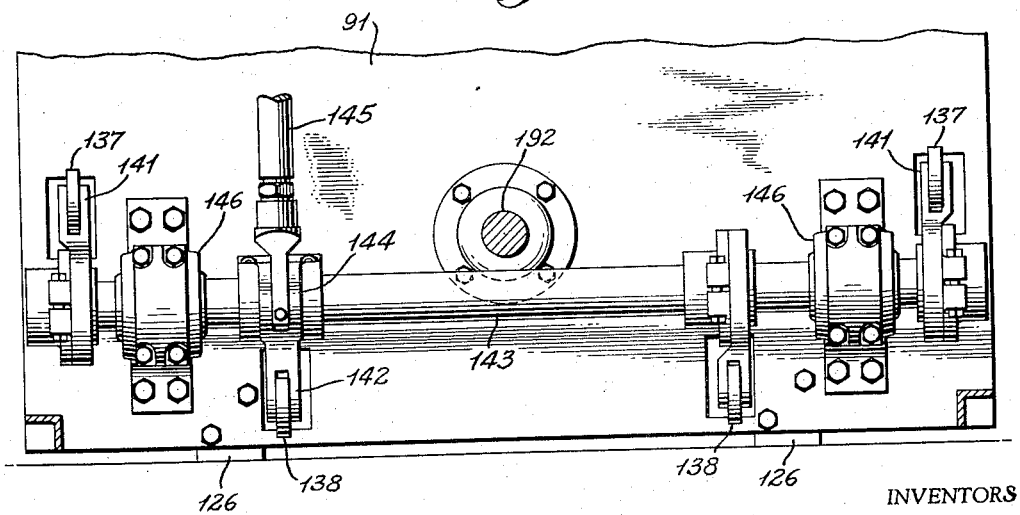
Figs. 19 is a side view of the traverse bar actuating mechanism.
Figure 22:
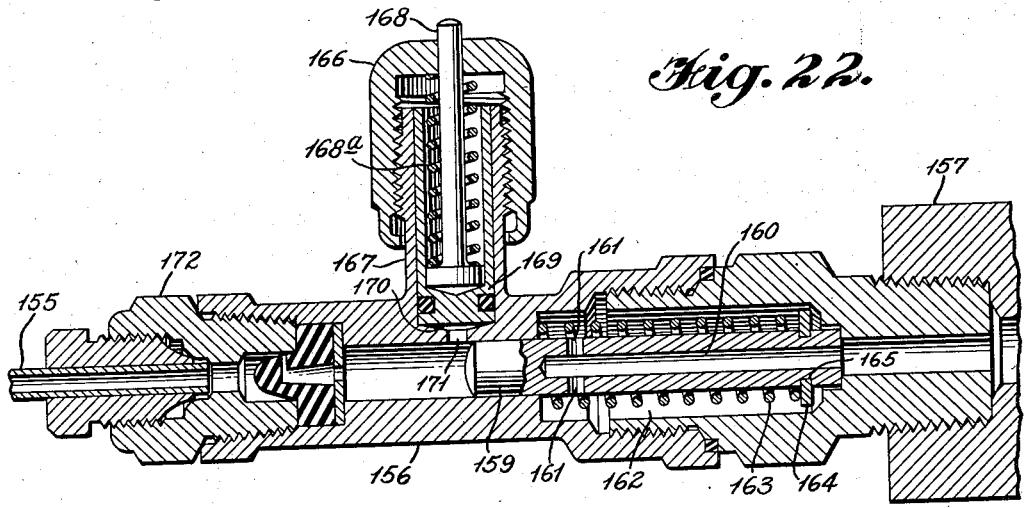
Fig. 22 is a sectional view of one of the oil injectors shown in Fig. 20.

The arms 135 and 136 are connected to the actuating bars 137 and 138 by bearing assemblies 139 and 140 respectively. The actuating bars 137 and 138 extend over the length of the machine into the motor cabinet 91 and they are connected to the arms 141 and 142, respectively of the driving mechanism inside of the cabinet as shown in Figs. 18 and 19. The arms 141 and 142 are fixedly attached to the shaft 143 which is supported by the bearings 146 and is actuated by the arm 144 that is made integral with the arm 142 to form a bell crank arrangement. The arm 144 of the bell crank is pivotally attached to the rod 145 of the hydraulic traverse that will be described hereinafter.

As the bars 137 and 138 are oscillated back and forth by the mechanism shown in Fig. 19 which is actuated by the hydraulic traverse, the ring twister traverse rods 114 and 115 shown in Figs. 16 and 17 are caused to move up and down. The upward movement of these rods is accomplished by the movement of the bar 137, shown in Fig. 16, to the right and the movement of the bar 138, shown in Fig. 17, to the left. These movements rotate the arms 120 and 135, shown in Fig. 16, clockwise and the arms 121 and 136, shown in Fig. 17, also clockwise as described above and this produces upward traverse of the bobbins 23 by the ring 110 of the twister. The downward stroke of the ring 110 may be considered the return stroke that is effected by the force of gravity acting on this ring and the associated mechanism.

Details of the ring twister traveller ring and traveller as well as the oiling mechanism provided for supplying oil to the traveller ring are shown in Figs. 14, 20, 21 and 22. Each twister includes a traveller 109 and a traveller ring 110 that is moved up and down around the bobbin 23 while twist is applied to the cable and while the cable is collected on the bobbin, for the purpose of applying a twist to the cable that is collected upon the bobbin. As shown in Fig. 13, the ring 110 of the twister is supported between the rails 112 and 113 by the plate 111 which is bolted to the under sides of rails 112 and 113 by suitable bolts. A suitable large hole is cut into the plate 111 and the ring 110 of the twister is attached to the plate around this hole. The ring of the twister is thus supported around the bobbin 23 and may be traversed up and down with respect to said bobbin by means of the rods 114 and 115 which support the rails 112 and 113 as previously mentioned.

Figure 14:
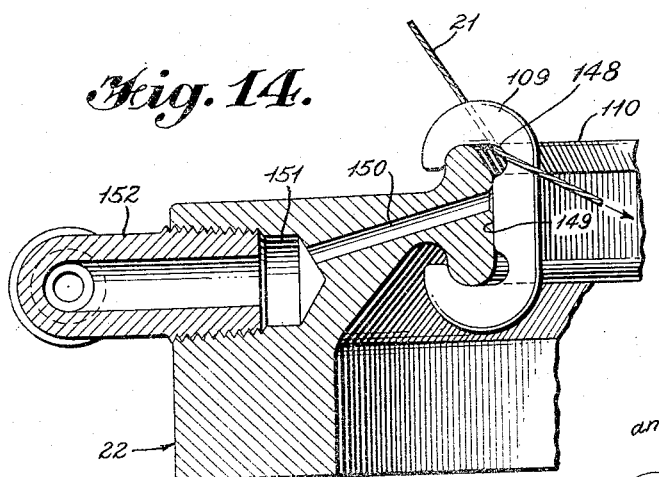
Fig. 14 is a view in partial section of the ring and traveller.
Figure 15:
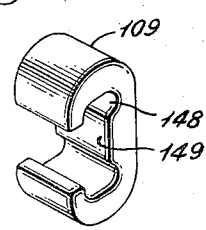
Fig. 15 is a perspective view of the traveller shown in Fig. 14.

The traveller ring 110 on which the traveller 109 travels in a circular path is made integral with the body of the ring as shown in the sectional views Figs. 13 and 14. The inner top edge of the traveller ring 110 is slightly bevelled or chamfered to form clearance for the yarn which passes through the small recess 148 formed in the traveller 109 as shown in Fig. 14. The traveller 109 is made of substantially C-shaped configuration of resilient material such as nylon that is well suited to this purpose because of its resistance to wear and other desirable 2,881,584 a predetermined number of steps during each downward stroke of the rod 145. In this way the length of the stroke of the rod 145 may be varied during a predetermined number of strokes of a certain cycle of operation.

Figure 36:
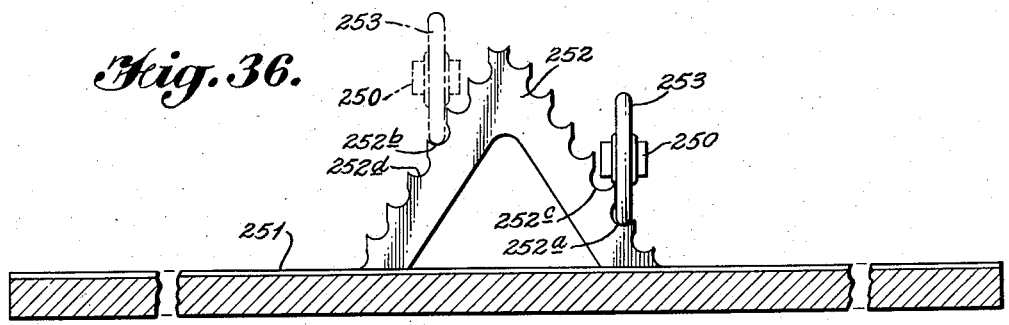
Fig. 36 is a linearly developed view of the disc and cam shown in Fig. 30.
Figure 33:
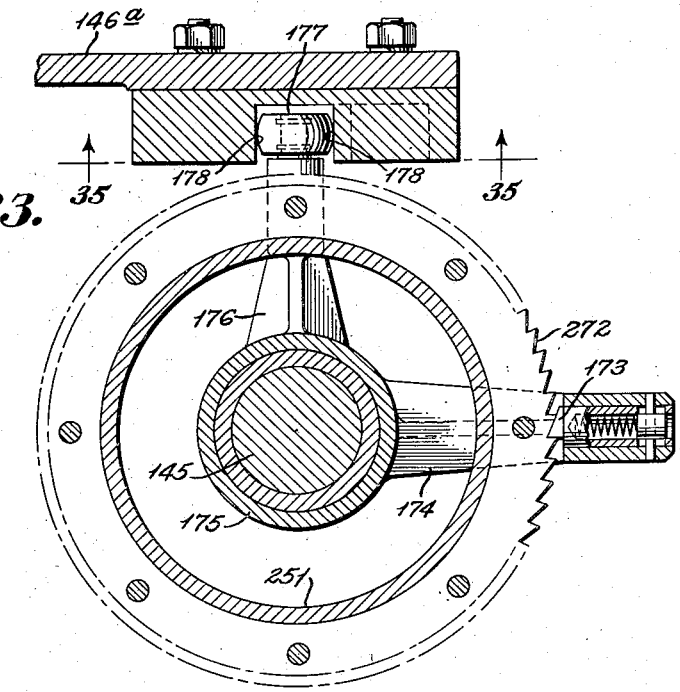
Fig. 33 is a sectional view along the line 33—33 of Fig. 29.

In Fig. 36 there is illustrated an expanded view of the disc 251 and the scalloped cam 252. The roller 253 engages the notch 252a on one up stroke of the rod 145 and on the following down stroke the disc 251 and cam 252 are rotated by the pawl 173 and ratchet wheel device through the action of the cam surfaces 178, so that the scalloped cam 252 is advanced a sufficient number of steps whereby on the next up stroke of the rod 145 the next notch 252b that is engaged by the roller 253 is displaced from the notch 252a by seven intervening notches. Only two of the notches of the scalloped cam may be engaged by the roller 253 during any given revolution of the disc 251 and scalloped cam 252. During the next revolution of the disc 251 the notches 252c and 252d are engaged by the roller 253 and so on in succeeding revolutions.

The scalloped cam functions to vary the length of the stroke of the rod 145 a certain number of times during a predetermined number of strokes of said rod. This therefor operates to vary the length of certain strokes of the rods 114 and 115 shown in Fig. 1, which support the ring 110 of the cord twister. The cord wound on the bobbin 23 is thereby distributed on this bobbin in a desired predetermined manner.

Figure 29:
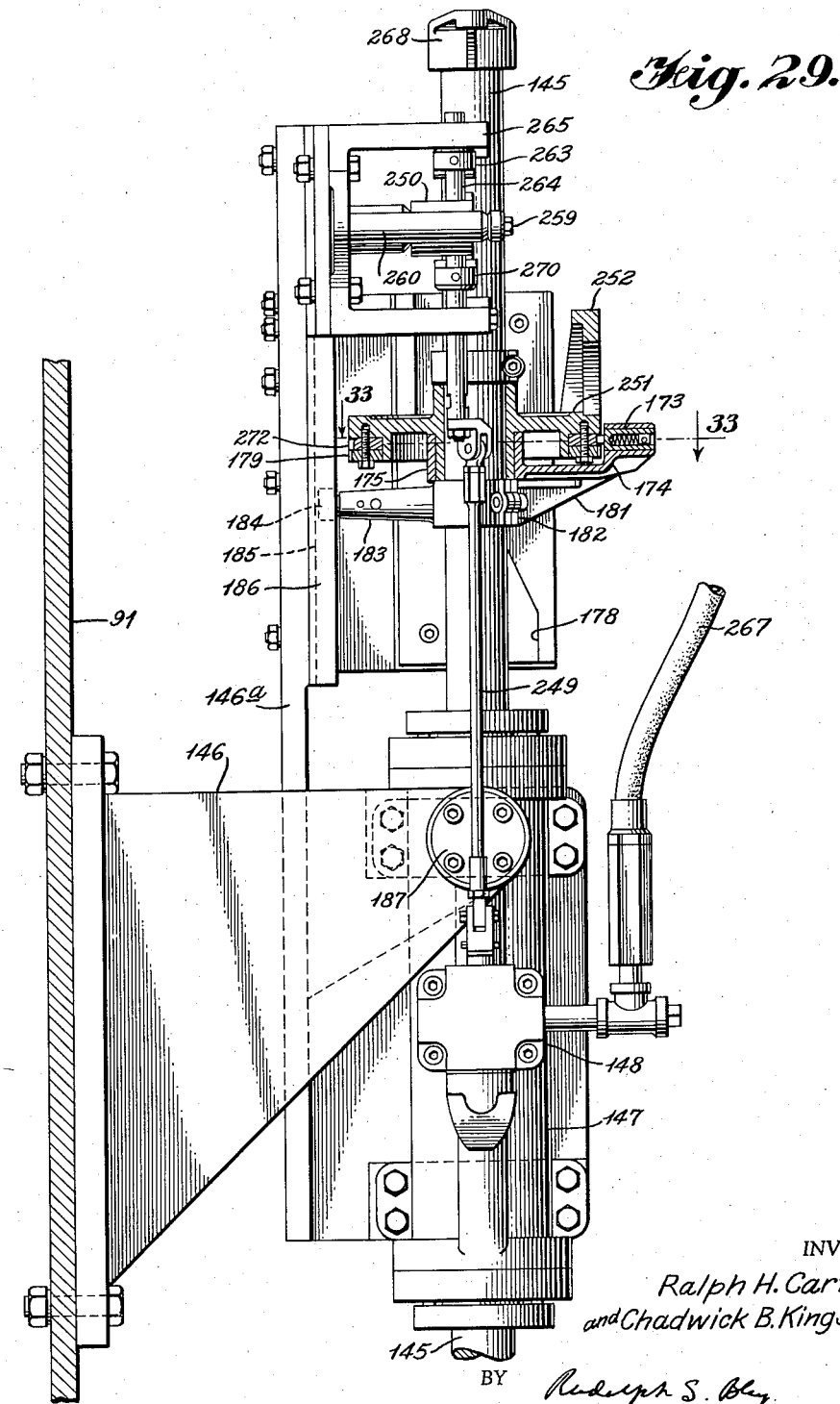
Fig. 29 is a side view partially in section of the hydraulic traverse employed for actuating the traverse bars.

In order to prevent the undesired backward rotation of the disc 251 and scalloped cam 252 when the pawl 173 retreats over the ratchet wheel 272 during the upward stroke of the rod 145, there is provided a notched ring 179, shown in Fig. 32, which is attached to the bottom of the ratchet wheel 272. A spring urged latch 180 that is supported by the arm 181 which is fixedly attached to the rod 145 by the collar 182, engages this notched ring 179 to prevent backward rotation of the ratchet wheel. The collar 182 is also provided with another arm 183 that carries a roller 184 which engages surfaces of the slot 185 of the member 186 which is supported on the hydraulic traverse frame as shown in Fig. 29. This functions to prevent rotation of the rod 145.

Figure 30:
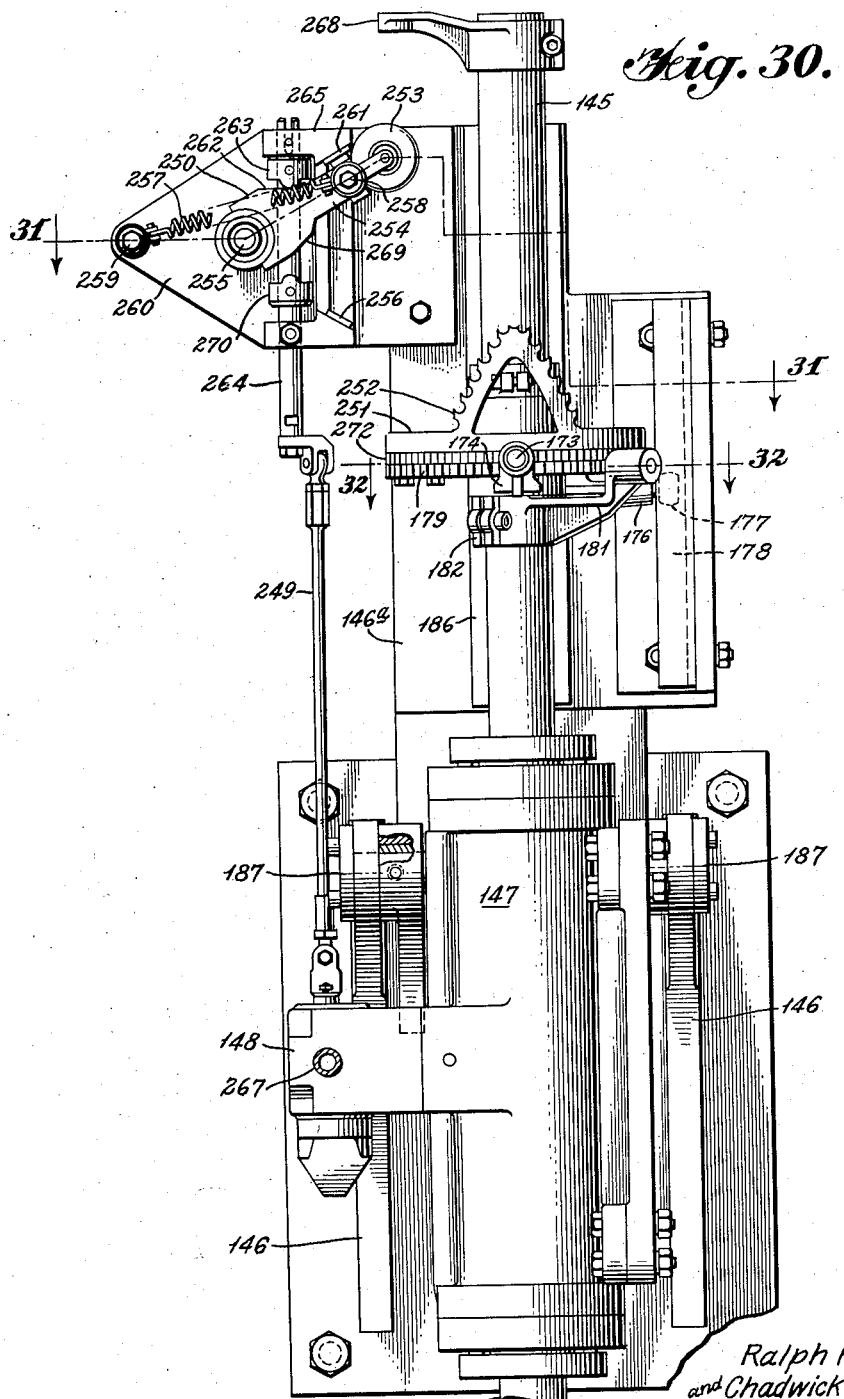
Fig. 30 is another view of the hydraulic traverse.
Figure 31:
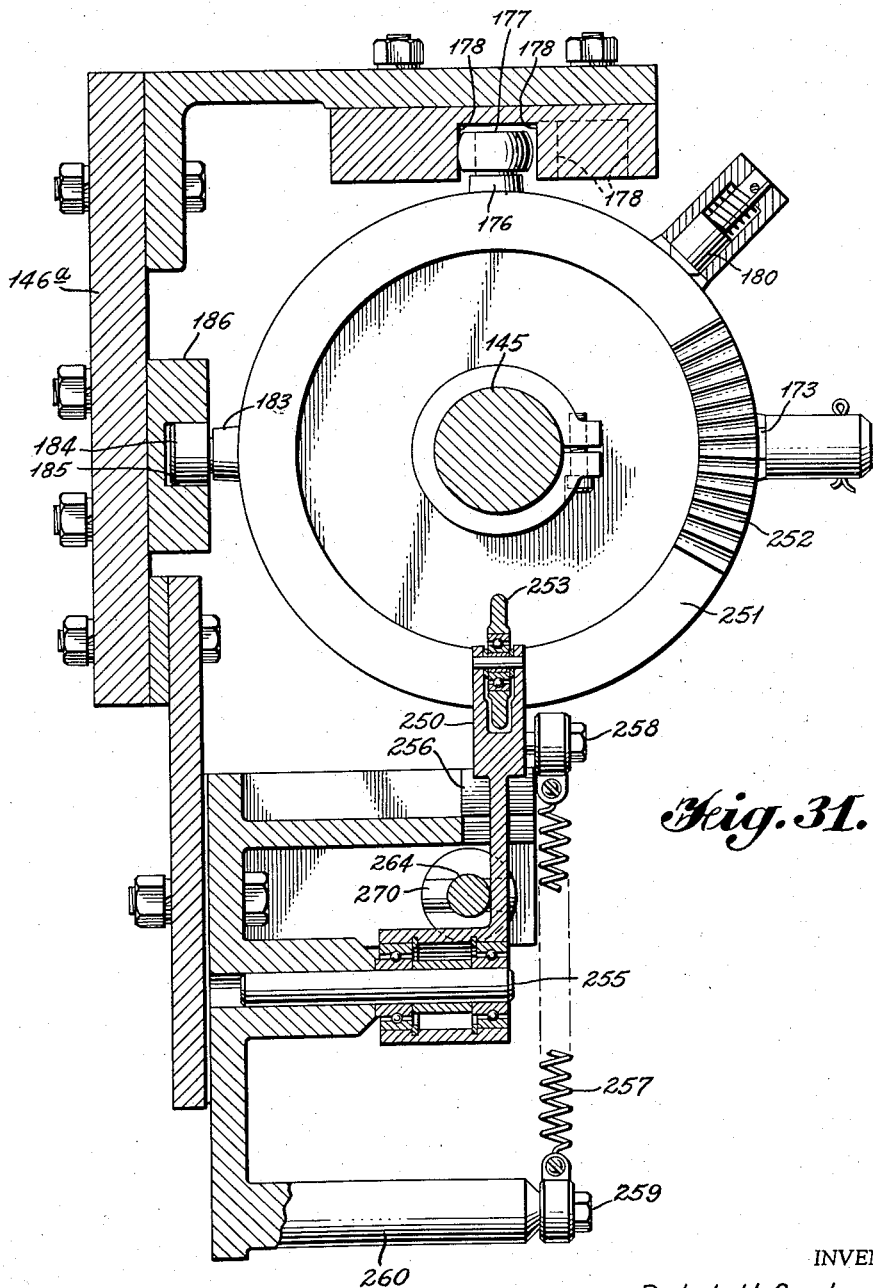
Fig. 31 is a sectional view along the line 31—31 of Fig. 30.

The cylinder 147 is carried by brackets 146a that are pivotally mounted in cradle 146 by bearing members 187 as shown in Fig. 30 so that the hydraulic traverse cylinder and associated parts may oscillate slightly as the rod 145 thereof actuates the arm 144 of the traverse bell crank.

Figure 38:
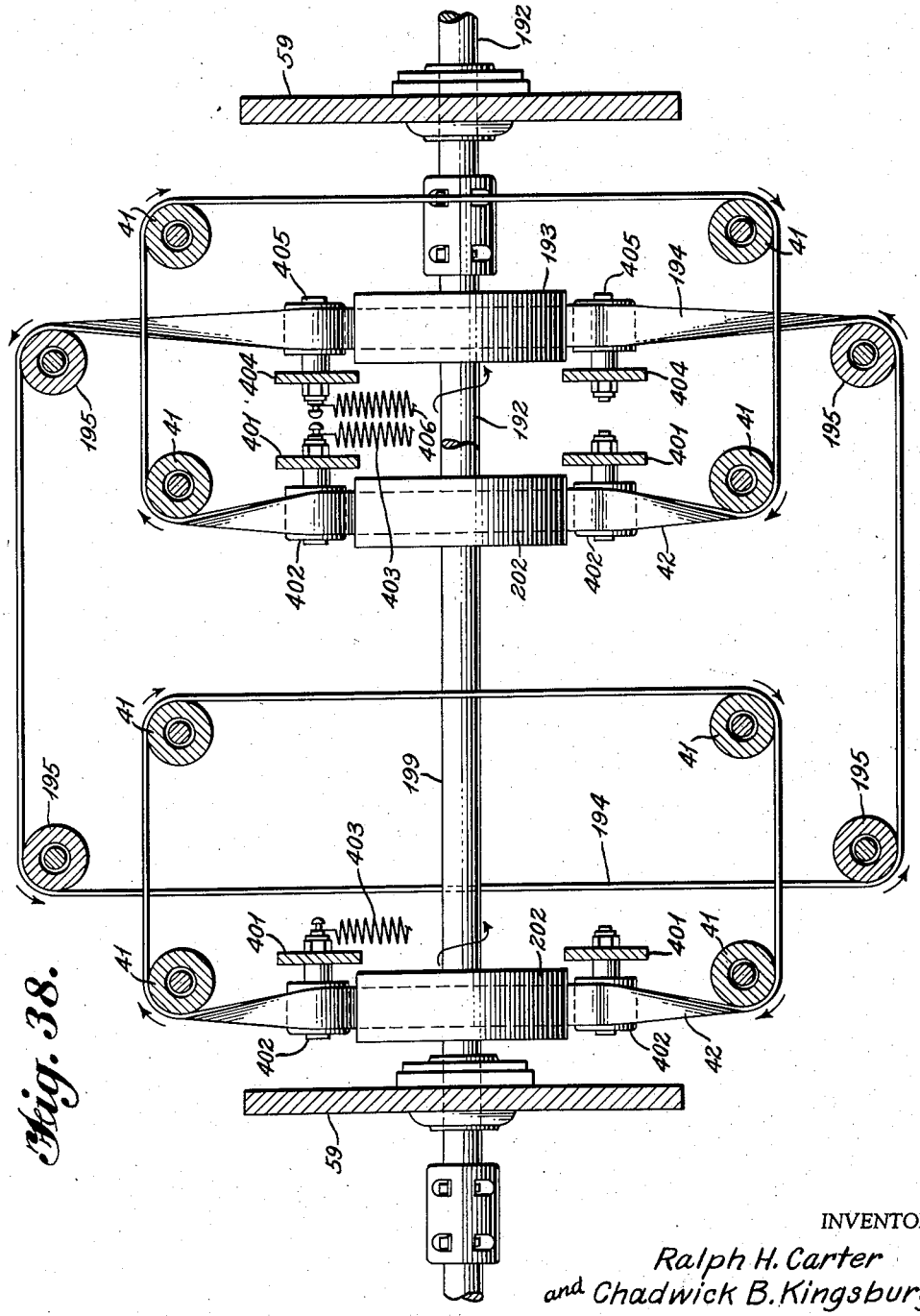
Fig. 38 is a horizontal sectional view showing the drive shafts and belt and pulley arrangements shown in Fig. 37.

Referring again to Figs. 23 and 24, the drive mechanism provided for this machine will now be described in detail. The motor 188 is provided with a plurality of V-pulleys 189 that are connected by the V-belts 190 to the pulleys 191 on the drive shaft 192. This drive shaft 192 is provided with a plurality of belt pulleys such as pulley 193, each of which engage and drive a belt such as the belt 194, as shown in Figs. 2, 37, 38 and 39. Each belt 194 engages four whorls 195 each of which is associated with a spindle as shown in Fig. 2. The drive shaft 192 extends throughout the length of the machine and is provided with a plurality of pulleys such as pulley 193 for the purpose of driving several groups of four spindles, such as shown in Fig. 38, although only one such group is shown.

The belt 194 is guided to and from the pulley 193 by idler pulleys 405 which are rotatably supported at the lower ends of the members 404, the top ends of these members being pivotally supported on the cross member 412 by the sleeve 413 and the bolt extending therethrough. The bottom end of one of the members 404 is attached to one end of the spring 406 and the other end of this spring is attached to a suitable bar that is attached to the frame member 59, so that suitable tension may be applied to the belt 194 through the idler pulley 405 supported by this member 404. The position of the other idler pulley 405 may be adjusted in steps with respect to pulley 193 by means of bar 407 and bolt 408.

Figure 23:
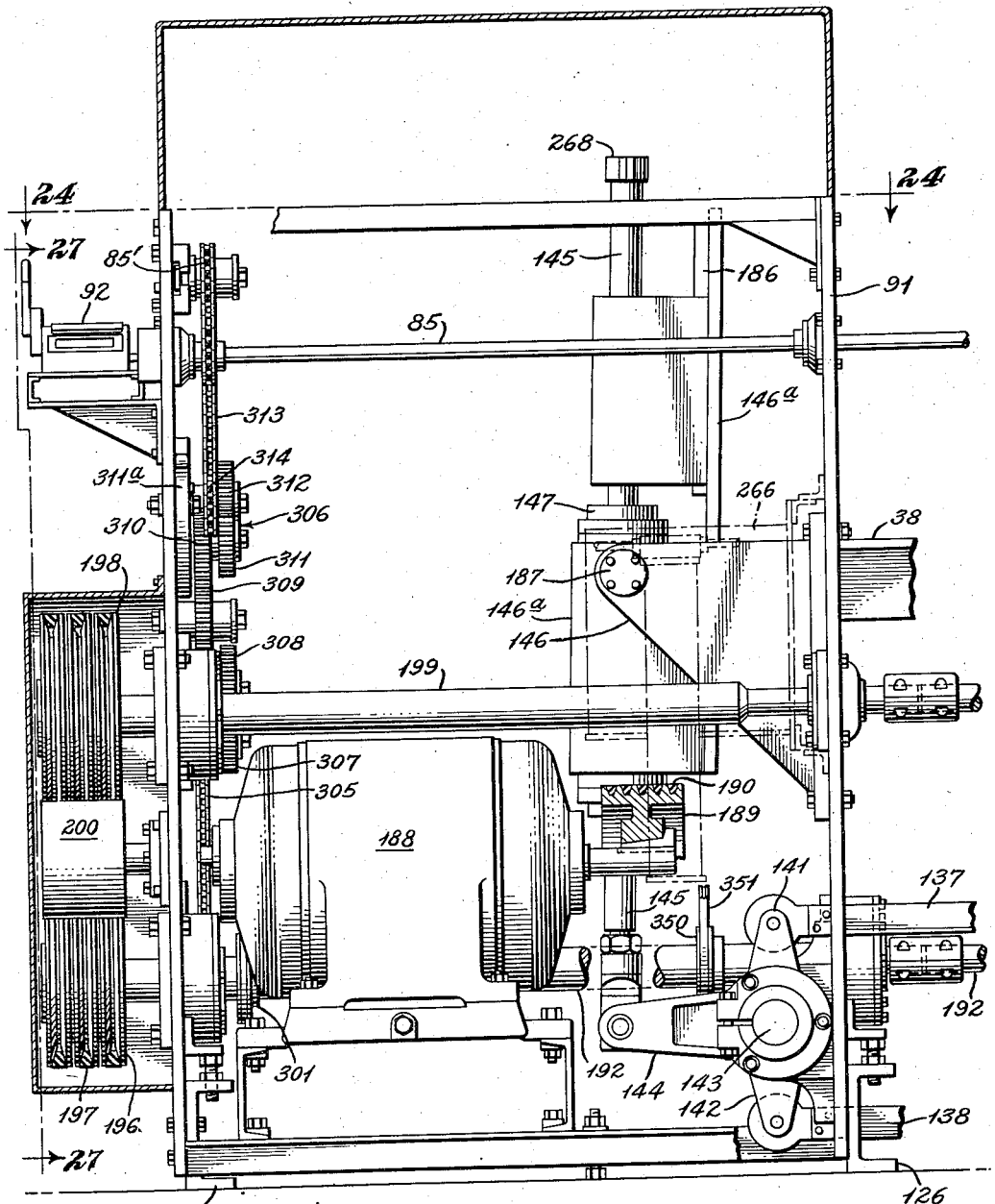
Fig. 23 is a side view of the drive mechanism employed in this machine.

Also positioned on the drive shaft 192 are V-pulleys 196 which engage the V-belts 197 for the purpose of driving the pulleys 198 that are attached to the shaft 199 as shown in Figs. 23 and 27. An idler pulley 200 that is supported by the adjustable plate 201 is provided for taking up the slack in the belts 197. Additional pulleys 202 are positioned on the shaft 199 and each of these pulleys drives a belt 42 which engages whorls 41 of spindles 47, such as shown in Fig. 3.

Each belt 42, driven by the pulley 202, engages the whorls 41 of four spindles as shown in Fig. 38 so that these spindles are also driven in groups of four. A pair of idler pulleys 402 is associated with each driving pulley 202 to guide the belt to and from the pulley 202. These idler pulleys 402 are rotatably supported at the lower ends of the members 401, the upper ends of which are pivotally supported by the sleeves 410 on the rods 409. The ends of these rods are supported in sockets 411 that are held by set screws in the frame members 59.

Figure 28:
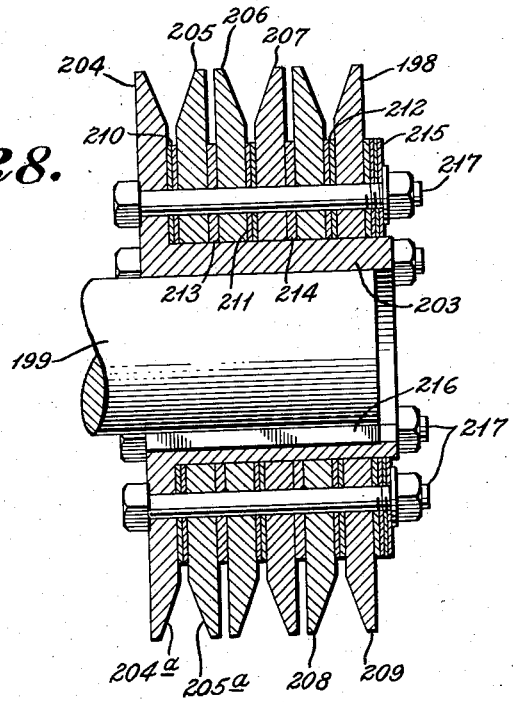
Fig. 28 is a sectional view of one of the V-pulley assemblies shown in Fig. 27.

The pulleys 196 and 198 are constructed as shown in Fig. 28 so as to be adjustable whereby the shaft 199 may be rotated at various speeds. Only one pulley is shown in this figure and this comprises a sleeve portion 203 that is keyed to the shaft, that is, either shaft 192 or shaft 199. The flange 204 is integral with one end of the sleeve 203 and the beveled surface 204a thereof cooperates with the beveled surface 205a of the ring 205 to form one V-shaped pulley. Additional rings 206, 207, 208 and 209 are positioned on the sleeve 203 and these are arranged so that the beveled surfaces of rings 206 and 207 cooperate to form a V-shaped pulley and the beveled surfaces of rings 208 and 209 cooperate to form another V-shaped pulley.

Shims in the shape of rings are positioned between the pulley elements to increase or decrease the effective diameters of the aforesaid V-shaped pulleys without at the same time materially shifting the planes of the centers of the V-belts 197 as will appear from the following description. For example if it is desired to increase the effective diameters of the pulley shown in Fig. 28, one of the shims of groups 210, 211 and 212 may be removed from between the pulley sections 204—205, 206—207 and 208—209, respectively, and placed next to the shims 213, 214 and 215, respectively. Both of the shims of groups 210, 211 and 212 may be removed if desired and placed adjacent to shims 213, 214 and 215 respectively, if it is desired to increase the effective diameters of the pulleys to that extent. On the other hand the number of shims in these groups 210, 211 and 212 may be increased by adding the shims 213, 214 and 215, respectively, thereto and the effective diameter of each of the pulleys may thereby be further reduced. Both of the pulleys 196 and 198 shown in Figs. 23 and 27 are constructed as described above and in this way a wide range of different speeds between the shafts 192 and 199 may be obtained.

As illustrated in Fig. 28 of the drawing, the end member 204 of the multiple V-pulley arrangement is made integral with the sleeve 203 which is keyed to the shaft by the key 216. The shaft is, of course, either shaft 192 or shaft 199, both of these being equipped with pulleys of this type. A plurality of bolts 217 is employed for holding the pulley elements including the shims heretofore described, in assembled relation and these bolts permit easy dis-assembly of the pulley whenever it is desired to rearrange the pulley and shim elements as described above.

Shaft 192 is also provided with a pulley 301 which is connected by the belt 302 to the pulley 303 of the speed reduction device 304 of any suitable conventional design, see Fig. 25. The output of this reduction device 304 is connected by a chain drive 305 to the gear train 306 which is shown in detail in Fig. 25. This gear train comprises gears 307, 308, 308b, 309, 310, 311 and 312, and this latter gear 312 is connected by a chain drive 313 to the sprockets on the feed roller shafts 85. Different size gears may be used for these individual gears in order to obtain the desired output speed and in order to accommodate different size gears that are mounted on the adjustable plates 308a and 311a, the plate 308a carrying the gears 307, 308 and 308b and the plate 311a carrying the gears 310, 311 and 312 and sprocket 314 are rotatable about the shafts of the gears 307 and 312, respectively, to permit a limited angular adjustment thereof. The sprocket wheel 314 that is associated with the gear 312 engages the chain 313 to transmit power from this gear train to the sprocket wheels that are mounted on the shafts 85.

The layout of the various power transmitting shafts and the connection thereof to the electric driving motor 188 is shown schematically in Fig. 39 in which the pulley 189 of the motor 188 is shown connected by the multiple V-belts 190 to the V-pulleys 191 that are positioned on the shaft 192. This shaft 192 extends throughout the length of the machine and it is provided with a plurality of pulleys 196, 193, 301 and 350. The pulleys 196 are connected by the multiple V-belt 197 to the V-pulleys 198 for the purpose of driving the shaft 199 as previously described and the pulley 193 is connected by the belt 194 to drive the whorls of the spindles associated with the ring twisters also as previously described. The pulley 301 is connected by the belt 302 to the pulley 303 of the speed reducing device 304 which is connected by a chain drive to the reduction gearing arrangement as shown in Fig. 25 for the purpose of driving the feed roller shafts such as the shaft 85 shown in Fig. 9. Two of these shafts are provided as shown in Fig. 25 and these are driven by the chain 313 which is driven by the sprocket 314 that is associated with the reduction gearing shown in Figs. 25 and 39. The pulley 350 is employed for driving the belt 351 that engages the pulley 352 of the speed reduction device 353, the pulley 354 of which drives the belt 355 which in turn drives the pulley 356 of the oil pump 266. This oil pump is connected by the pipes 358 and 359 to the valve 148 that is associated with the double acting cylinder 147 of the hydraulic traverse as described above.

In Fig. 39 two ply-twisting spindle arrangements are shown feeding the ply yarns 12 and 13 to the feed rollers driven by the shaft 85 and after the ply yarns leave these feed rollers and pass through the splitter guides 100 they are permitted to combine and form the cable 21 which is passed to the ring twister that is associated with the bobbin 23. This ring twister is connected by a mechanical linkage, that was previously described, to the rod 145 of the hydraulic traverse and this mechanical linkage is shown by the broken line 145a.

A switch 370 is associated with one of the traverse rails 112 or 113 as illustrated schematically in Fig. 39 and this switch is mounted so as to be opened each time these rails reach the lower extremity of their stroke. This switch 370 is connected in parallel with the micro-switch 371 that is positioned inside of the housing of the yardage counter 92 which is a "Productimeter" made by the Durant Manufacturing Co., of Milwaukee, Wisconsin. This counter is located on the outside of the cabinet 91 as shown in Fig. 1 and is connected to be driven by the shaft 85 by a suitable chain drive 372 as shown in Fig. 24, this mechanical connection being shown by the broken line 372a in Fig. 39 wherein one of the indicator wheels 373 of the yardage counter is illustrated in side elevation. The indicator wheels of this counter are provided with notches such as notch 374. When the desired yardage is indicated by the indicator wheels of this counter, said notches are in alignment so as to be adapted to receive the rod 375 that is associated with the resilient blade 376 of the micro-switch 371. When these notches are in alignment so as to receive the rod 375, the resilient blade of this switch 371 permits this switch to open, this being at the yardage of cable that it is desired to place upon the cable bobbins such as the bobbin 23 and all of these bobbins have the same yardage. However, the machine is not permitted to stop until the traverse rails 112—113 are at the lower extremity of their traverse at which point the switch 370 is opened. The switch 370 is connected in parallel with the switch 371 and since the switch 371 is already open, opening of the switch 370 disconnects the circuit of the motor control relay 377. Deenergizing this relay functions to open the power circuit to the electric motor 188 thereby stopping the machine.

The electric motor 188 is arranged to drive the shaft 192 substantially at constant speed and thereby the ring twisters are also operated at a certain speed so as to put a certain number of twists per inch into the cable. However, the speed of the shaft 199 which is arranged to drive the spindles of the ply ends may be changed by changing the effective diameters of the pulleys 196 and 198 as described in connection with the description of Fig. 28. In other words, the speed of the spindles that place the twist into the ply ends may be increased or decreased in this manner. Furthermore, the speed with which the ply ends 12 and 13 are drawn from the spindles thereof may be changed by changing the gearing arrangement 306 shown in Figs. 25 and 39. The faster the ply ends are drawn from these spindles the lower is the twist applied to these ends and vice versa. Furthermore, the twist that results in the cable because of the operation of the ring twister may also be controlled by the speed of which the ply ends forming the cable are fed to the ring twister and this may, of course, be controlled by the speed of the feed rollers.

While we have described this invention in detail with respect to certain embodiments thereof, it is not desired to limit it to the details described and illustrated except insofar as they are set forth in the following claims.

We claim:

1. In a machine for plying and twisting yarn to produce cord such as is suitable for tire fabric, a plurality of sources of yarn, withdrawing means for withdrawing a plurality of yarns from said sources and feeding them to a ring twister, means for combining said yarns, a ring twister for twisting said combined yarns into a cord, said ring twister comprising a rotating bobbin and a twister ring and traveler, a motor drivingly connected to said bobbin and to said withdrawing means, a ring rail for supporting said twister ring for movement up and down about said bobbin to distribute the cord upon said bobbin, means driven by said motor for moving said ring rail, a first electric circuit for energizing said motor, means operable by said ring rail for breaking said circuit each time said ring rail moves to its lowest position, a holding circuit for normally preventing the breaking of said first circuit from deenergizing said motor, and means operable upon the withdrawal of a preselected amount of yarn from said sources for breaking said holding circuit whereby the next succeeding breaking of said first circuit is effective to denergize said motor and stop said machine.

2. In a machine for plying and twisting yarn to produce cord such as is suitable for tire fabric, a plurality of sources of yarn, common feed roller means for withdrawing a plurality of yarns from said sources and feeding them to a ring twister, means for maintaining said yarns separated during their passage through said feed roller means including individual yarn guides located on the opposite side of said feed roller means from said sources of yarn, means for combining said yarns, a ring twister for twisting said combined yarns into a cord, said ring twister comprising a rotating bobbin and a twister ring and traveler, said individual yarn guides preventing the twist from running up into said feed roller means, a motor drivingly connected to said bobbin and to said feed roller means, a ring rail for supporting said twister ring for movement up and down about said bobbin to distribute the cord upon said bobbin, means driven by said motor for moving said ring rail, a first electric circuit for energizing said motor, means operable by said ring rail for breaking said circuit each time said ring rail moves to its lowest position, a holding circuit for normally preventing the breaking of said first circuit from deenergizing said motor, and means operable upon the withdrawal of a preselected amount of yarn from said sources for breaking said holding circuit whereby the next succeeding breaking of said first circuit is effective to deenergize said motor and stop said machine.

3. In a machine for plying and twisting yarn to produce cord such as is suitable for tire fabrics, a plurality of sources of yarn, common feed roller means for withdrawing a plurality of yarns from said sources and feeding them to a take-up bobbin, metering means for measuring the amount of yarn withdrawn from said sources, a common drive for said feed roller means and said metering means whereby said metering means measures the amount of yarn passing through said feed roller means, means for maintaining said yarns separated during their passage through said feed roller means including individual yarn guides located on the opposite side of said feed roller means from said sources of yarn, means for combining said yarns, means for twisting said combined yarns into a cord, said individual yarn guides preventing the twist from running up into said feed roller means, a take-up bobbin for collecting said cord, a motor drivingly connected to said bobbin and to said common shaft, an electric circuit for energizing said motor, said circuit being controlled by said metering means, and means operable by said metering means for breaking said circuit when said metering means has measured a predetermined length of yarn.

4. In a machine for plying and twisting yarn to produce cord such as is suitable for tire fabric, a plurality of sources of yarn, common feed roller means for withdrawing a plurality of yarns from said sources and feeding them to a ring twister, metering means for measuring the amount of yarn withdrawn from said sources, a common drive for said feed roller means and said metering means whereby said metering means measures the amount of yarn passing through said feed roller means, means for maintaining said yarns separated during their passage through said feed roller means including individual yarn guides located on the opposite side of said feed roller means from said sources of yarn, means for combining said yarns, a ring twister for twisting said combined yarns into a cord, said ring twister comprising a rotating bobbin and a twister ring and traveler, said individual yarn guides preventing the twist from running up into said feed roller means, a motor drivingly connected to said bobbin and to said common drive, a ring rail for supporting said twister ring for movement up and down about said bobbin to distribute the cord upon said bobbin, means driven by said motor for moving said ring rail, an electric circuit for energizing said motor, said circuit being controlled by said metering means, and means operable by said metering means for breaking said circuit when said metering means has measured a preselected length of yarn.

5. In a machine for plying and twisting yarn to produce cord such as is suitable for tire fabric, a plurality of sources of yarn, common feed roller means for withdrawing a plurality of yarns from said sources and feeding them to a ring twister, metering means for measuring the amount of yarn withdrawn from said sources, a common drive for said feed roller means and said metering means whereby said metering means measures the amount of yarn passing through said feed roller means, means for maintaining said yarns separated during their passage through said feed roller means including individual yarn guides located on the opposite side of said feed roller means from said sources of yarn, means for combining said yarns, a ring twister for twisting said combined yarns into a cord, said ring twister comprising a rotating bobbin and a twister ring and traveler, said individual yarn guides preventing the twist from running up into said feed roller means, a motor drivingly connected to said bobbin and to said common drive, a ring rail for supporting said twister ring for movement up and down about said bobbin to distribute the cord upon said bobbin, means driven by said motor for moving said ring rail, two parallel electric circuits for energizing said motor, a first one of said circuits being controlled by said metering means and the other by said ring rail, means operable by said metering means for breaking said first one of said circuits when said metering means has measured a preselected length of yarn, and means operable by said ring rail for breaking the other of said circuits when said ring rail moves to its lowest position whereby said motor will be deenergized and the machine stopped with the ring rail in its lowest position after a preselected amount of yarn has been withdrawn from said sources of supply.

6. In a machine for plying and twisting yarn to produce cord such as is suitable for tire fabric, a pair of spindles for rotatably supporting a pair of bobbins having yarn wound thereon, means for rotating said spindles to apply twist to the yarn as it is drawn from said bobbins, common feed roller means for withdrawing the yarns from said bobbins and feeding them to a take-up bobbin, said common feed roller means comprising a driven roller and a second roller pivotally mounted adjacent to said driven roller and in contact therewith so that said second roller is driven by said driven roller, said second roller having tapered end portions and a cylindrical central portion, means on said tapered end portions for guiding the yarns onto said cylindrical portion and between said rollers, means for maintaining said yarns separated during their passage through said feed roller means, said last named means including individual yarn guides located on the opposite side of said feed roller means from said bobbins, means for combining said yarns, means for twisting said combined yarns into a cord, said individual yarn guides preventing the twist from running up into said feed roller means, and a take-up bobbin for collecting said cord.

7. In a machine for plying and twisting yarn to produce cord such as is suitable for tire fabric, a pair of spindles for rotatably supporting a pair of bobbins having yarn wound thereon, means for rotating said spindles to apply twist to the yarn as it is drawn from said bobbins, common feed roller means for withdrawing the yarns from said bobbins and feeding them to a take-up bobbin, said common feed roller means comprising a driven roller and a second roller pivotally mounted adjacent to said driven roller and in contact therewith so that said second roller is driven by said driven roller, said second rollers having tapered end portions and a cylindrical central portion, means on said tapered end portions for guiding the yarns onto said cylindrical portion and between said rollers, metering means for measuring the amount of yarn withdrawn from said bobbins, a common drive for said feed roller means and said metering means whereby said metering means measures the amount of yarn passing through said feed roller means, means for maintaining said yarns separated during their passage through said feed roller means including individual yarn guides located on the opposite side of said feed roller means from said first mentioned bobbins, means for combining said yarns, means for twisting said combined yarns into a cord, said individual yarn guides preventing the twist from running up into said feed roller means, a take-up bobbin for collecting said cord, a motor drivingly connected to all of said bobbins and to said feed roller means, an electric circuit for energizing said motor, said circuit being controlled by said metering means, and means operable by said metering means for breaking said circuit when said metering means has measured a preselected length of yarn.

8. In a machine for plying and twisting yarn to produce cord such as is suitable for tire fabric, a pair of spindles for rotatably supporting a pair of bobbins having yarn wound thereon, means for rotating said spindles to apply twist to the yarn as it is drawn from said bobbins, common feed roller means for withdrawing the yarns from said bobbins and feeding them to a ring twister, said common feed roller means comprising a driven roller and a second roller pivotally mounted adjacent to said driven roller and in contact therewith so that said second roller is driven by said driven roller, said second roller having tapered end portions and a cylindrical central portion, means on said tapered end portions for guiding the yarns onto said cylindrical portion and between said rollers, metering means for measuring the amount of yarn withdrawn from said bobbins, a common drive for said feed roller means and said metering means whereby said metering means measures the amount of yarn passing through said feed roller means, means for maintaining said yarns separated during their passage through said feed roller means including individual yarn guides located on the opposite side of said feed roller means from said bobbins, means for combining said yarns, a ring twister for twisting said combined yarns into a cord, said ring twister comprising a rotating take-up bobbin and a twister ring and traveler, said individual yarn guides preventing the twist from running up into said feed roller means, a motor drivingly connected to all of said bobbins and to said common drive, a ring rail supporting said twister ring for movement up and down about said take-up bobbin to distribute the cord upon said bobbin, means driven by said motor for moving said ring rail, two parallel electric circuits for energizing said motor, a first one of said circuits being controlled by said metering means and the other by said ring rail, means operable by said metering means for breaking said first one of said circuits when said metering means has measured a preselected length of yarn, and means operable by said ring rail for breaking the other of said circuits when said ring rail moves to its lowest position whereby said motor will be deenergized and the machine stopped with the ring rail in its lowest position after a preselected amount of yarn has been withdrawn from the first mentioned bobbins.

9. In a machine for plying and twisting yarn to produce cord such as is suitable for tire fabric, a plurality of sources of yarn, withdrawing means for withdrawing a plurality of yarns from said sources and feeding them to a ring twister, metering means for measuring the amount of yarn withdrawn from said sources, a common drive for said metering means and said withdrawing means whereby said metering means measures the amount of yarn passing through said withdrawing means, means for combining said plurality of yarns, a ring twister for twisting said combined yarns into a cord, said ring twister comprising a rotating bobbin and a twister ring and traveler, a motor drivingly connected to said bobbin and to said common drive, a ring rail supporting said twister ring and controlling its movement up and down about said bobbin to distribute the cord upon said bobbin, power means for controlling the movement of said ring rail, said power means comprising a double-actinng cylinder and a piston mounted therein for movement in opposite directions, a pump for supplying fluid under pressure to said cylinder, means drivingly connecting said motor to said pump, valve means for admitting the fluid supplied by said pump alternately to opposite ends of said cylinder for driving said piston alternately in opposite directions, means operatively connecting said piston to said ring rail, means operable by said piston for operating said valve means whereby movement of said piston through a predetermined stroke is effective to operate said valve means and reverse the action of said double-acting cylinder, an electric circuit for energizing said motor, said circuit being controlled by said metering means, and means operable by said metering means for breaking said circuit when said metering means has measured a preselected length of yarn.

10. In a machine for plying and twisting yarn to produce cord such as is suitable for tire fabric, a plurality of sources of yarn, withdrawing means for withdrawing a plurality of yarns from said sources and feeding them to a ring twister, metering means for measuring the amount of yarn withdrawn from said sources, a common drive for said metering means and said withdrawing means whereby said metering means measures the amount of yarn passing through said withdrawing means, means for combining said plurality of yarns, a ring twister for twisting said combined yarns into a cord, said ring twister comprising a rotating bobbin and a twister ring and traveler, a motor drivingly connected to said bobbin and to said common drive, a ring rail supporting said twister ring for movement up and down about said bobbin to distribute the cord upon said bobbin, said ring rail being adapted to be moved upwardly by power and downwardly by the force of gravity, power means for moving said ring rail upwardly and controlling its downward movement, said power means comprising a double-acting cylinder and a piston mounted therein for movement in opposite directions, a pump for supplying fluid under pressure to said cylinder, means drivingly connecting said motor to said pump, valve means for admitting the fluid supplied by said pump alternately to opposite ends of said cylinder for driving said piston alternately in opposite directions, means operatively connecting said piston to said ring rail whereby movement of said piston in a first direction is effective to raise said ring rail and movement of said piston in the opposite direction permits said ring rail to move downwardly under the force of gravity, valve operating means on said piston for operating said valve means whereby movement of said piston through a predetermined stroke is effective to operate said valve means and reverse the action of said double-acting cylinder, an electric circuit for energizing said motor, said circuit being controlled by said metering means, and means operable by said metering means for breaking said circuit when said metering means has measured a preselected length of yarn.

11. In a machine for plying and twisting yarn to produce cord such as is suitable for tire fabric, a plurality of sources of yarn, withdrawing means for withdrawing a plurality of yarns from said sources and feeding them to a ring twister, metering means for measuring the amount of yarn withdrawn from said sources, a common drive for said metering means and said withdrawing means whereby said metering means measures the amount of yarn passing through said withdrawing means, means for combining said plurality of yarns, a ring twister for twisting said combined yarns into a cord, said ring twister comprising a rotating bobbin and a twister ring and traveler, a motor drivingly connected to said bobbin and to said common drive, a ring rail supporting said twister ring for movement up and down about said bobbing to distribute the cord upon said bobbin, said ring rail being adapted to be moved upwardly by power and downwardly by the force of gravity, power means for moving said ring rail upwardly and controlling its downward movement, said power means comprising a double-acting cylinder and a piston mounted therein for movement in opposite directions, a pump for supplying fluid under pressure to said cylinder, means drivingly connecting said motor to said pump, valve means for admitting the fluid supplied by said pump alternately to opposite ends of said cylinder for driving said piston alternately in opposite directions, means operatively connecting said piston to said ring rail whereby movement of said piston in a first direction is effective to raise said ring rail and movement of said piston in the opposite direction permits said ring rail to move downwardly under the force of gravity, valve operating means on said piston for operating said valve means whereby movement of said piston through a predetermined stroke is effective to operate said valve means and reverse the action of said double-acting cylinder, two parallel electric circuits for energizing said motor, a first one of said circuits being controlled by said metering means and the other by said ring rail, means operable by said metering means for breaking said first one of said circuits when said metering means has measured a preselected length of yarn, means operable by said ring rail for breaking the other of said circuits when said ring rail moves to its lowest position whereby said motor will be deenergized and the machine stopped with the ring rail in its lowest position after a preselected amount of yarn has been withdrawn from the sources of supply.

References Cited in the file of this patent

UNITED STATES PATENTS

| | | |
|---|---|---|
| 261,409 | Tynam | July 18, 1882 |
| 578,678 | Seymour | Mar. 9, 1897 |
| 790,805 | Salathe et al. | May 23, 1905 |
| 2,111,209 | Dreyfus | Mar. 15, 1938 |
| 2,437,101 | Larsen | Mar. 2, 1948 |